(12) United States Patent
Hitchcock et al.

(10) Patent No.: US 9,450,941 B2
(45) Date of Patent: Sep. 20, 2016

(54) RECOVERY OF MANAGED SECURITY CREDENTIALS

(71) Applicant: Amazon Technologies, Inc., Seattle, WA (US)

(72) Inventors: Daniel W. Hitchcock, Bothell, WA (US); Brad Lee Campbell, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/615,931

(22) Filed: Feb. 6, 2015

(65) Prior Publication Data

US 2015/0180852 A1  Jun. 25, 2015

Related U.S. Application Data

(63) Continuation of application No. 13/363,681, filed on Feb. 1, 2012, now Pat. No. 8,955,065.

(51) Int. Cl.
*H04L 29/06* (2006.01)
*G06F 21/00* (2013.01)
(Continued)

(52) U.S. Cl.
CPC .............. *H04L 63/08* (2013.01); *G06F 21/00* (2013.01); *G06F 21/41* (2013.01); *G06F 21/45* (2013.01); *H04L 63/0815* (2013.01); *H04L 63/0838* (2013.01); *H04L 63/0876* (2013.01); *G06F 2221/2131* (2013.01)

(58) Field of Classification Search
CPC .... G06F 21/00; G06F 63/0815; G06F 21/41; G06F 2221/2131; G06F 21/45; H04L 63/08; H04L 63/0815; H04L 63/0876; H04L 63/0838

USPC .............................................................. 726/5
See application file for complete search history.

(56) References Cited

U.S. PATENT DOCUMENTS 6,006,333 A   12/1999  Nielsen
6,182,131 B1   1/2001  Dean et al.
6,182,229 B1   1/2001  Nielsen (Continued)

FOREIGN PATENT DOCUMENTS

JP   2002169782 A   6/2002
JP   2005502931 A   1/2005

(Continued)

OTHER PUBLICATIONS

International Search Report and Written Opinion, PCT application No. PCT/US13/23818, mailed Apr. 11, 2013, pp. 1-17.

(Continued)

*Primary Examiner* — Don Zhao
(74) *Attorney, Agent, or Firm* — Thomas | Horstemeyer, LLP

(57) ABSTRACT

Disclosed are various embodiments for recovery and other management functions relating to security credentials which may be centrally managed. Account data, which includes multiple security credentials for multiple network sites for a user, is stored by a service in an encrypted form. A request for the account data is obtained from a client. The request specifies a security credential for accessing the account data. The account data is sent to the client in response to determining that the client corresponds to a preauthorized client and in response to determining that the security credential for accessing the account data is valid.

20 Claims, 12 Drawing Sheets

(51) Int. Cl.
*G06F 21/41* (2013.01)
*G06F 21/45* (2013.01)

(56) References Cited

U.S. PATENT DOCUMENTS

| | | |
|---|---|---|
| 7,155,739 B2 | 12/2006 | Bari et al. |
| 7,428,750 B1 | 9/2008 | Dunn et al. |
| 7,441,263 B1 | 10/2008 | Bakshi et al. |
| 7,673,045 B1 | 3/2010 | Battle et al. |
| 8,051,168 B1 * | 11/2011 | Boysko et al. .............. 709/225 |
| 8,151,328 B1 * | 4/2012 | Lundy et al. .................... 726/5 |
| 8,276,190 B1 | 9/2012 | Chang et al. |
| 8,327,428 B2 * | 12/2012 | Bailey et al. .................... 726/8 |
| 8,700,729 B2 | 4/2014 | Dua |
| 8,745,705 B2 | 6/2014 | Hitchcock et al. |
| 8,776,194 B2 | 7/2014 | Hitchcock et al. |
| 8,819,795 B2 | 8/2014 | Hitchcock et al. |
| 8,863,250 B2 | 10/2014 | Hitchcock et al. |
| 2002/0023059 A1 | 2/2002 | Bari et al. |
| 2002/0031230 A1 | 3/2002 | Sweet et al. |
| 2002/0083012 A1 | 6/2002 | Bush et al. |
| 2002/0120757 A1 | 8/2002 | Sutherland et al. |
| 2003/0005299 A1 | 1/2003 | Xia et al. |
| 2003/0074580 A1 * | 4/2003 | Knouse et al. .............. 713/201 |
| 2005/0027713 A1 | 2/2005 | Cameron et al. |
| 2005/0228899 A1 | 10/2005 | Wendkos et al. |
| 2006/0136985 A1 | 6/2006 | Ashley et al. |
| 2006/0165060 A1 | 7/2006 | Dua |
| 2006/0200424 A1 | 9/2006 | Cameron et al. |
| 2007/0005964 A1 | 1/2007 | Grosse et al. |
| 2007/0044143 A1 * | 2/2007 | Zhu et al. ......................... 726/8 |
| 2007/0078785 A1 | 4/2007 | Bush et al. |
| 2007/0234062 A1 * | 10/2007 | Friedline ...................... 713/183 |
| 2007/0234410 A1 * | 10/2007 | Geller ............................... 726/8 |
| 2007/0240226 A1 * | 10/2007 | Song et al. ...................... 726/27 |
| 2007/0250920 A1 | 10/2007 | Lindsay |
| 2008/0028444 A1 | 1/2008 | Loesch et al. |
| 2008/0031447 A1 * | 2/2008 | Geshwind et al. ............. 380/46 |
| 2008/0040790 A1 * | 2/2008 | Kuo ................................ 726/12 |
| 2008/0120716 A1 * | 5/2008 | Hall et al. ....................... 726/16 |
| 2008/0146194 A1 | 6/2008 | Yang et al. |
| 2008/0168539 A1 | 7/2008 | Stein |
| 2008/0201768 A1 | 8/2008 | Koo et al. |
| 2008/0256594 A1 | 10/2008 | Satish et al. |
| 2009/0042540 A1 | 2/2009 | Bodnar et al. |
| 2009/0089883 A1 | 4/2009 | Martocci |
| 2009/0144546 A1 | 6/2009 | Jancula et al. |
| 2009/0150169 A1 | 6/2009 | Kirkwood et al. |
| 2009/0158406 A1 | 6/2009 | Jancula et al. |
| 2009/0259588 A1 * | 10/2009 | Lindsay ........................ 705/40 |
| 2010/0071056 A1 | 3/2010 | Cheng et al. |
| 2010/0100952 A1 * | 4/2010 | Sample et al. .................... 726/9 |
| 2010/0161965 A1 * | 6/2010 | Solin et al. .................... 713/155 |
| 2010/0162373 A1 | 6/2010 | Springfield et al. |
| 2010/0178944 A1 | 7/2010 | Fodor |
| 2010/0198698 A1 | 8/2010 | Raleigh et al. |
| 2012/0011577 A1 | 1/2012 | Mashimo |

FOREIGN PATENT DOCUMENTS

| | | |
|---|---|---|
| JP | 2005346570 A | 12/2005 |
| JP | 2008282388 A | 11/2008 |
| JP | 2008287701 A | 11/2008 |
| JP | 2011505735 A | 2/2011 |

OTHER PUBLICATIONS

U.S. Appl. No. 13/363,664 entitled "Authentication Management Services," filed Feb. 1, 2012.
U.S. Appl. No. 13/363,675 entitled "Presenting Managed Security Credentials to Network Sites," filed Feb. 1, 2012.
U.S. Appl. No. 13/363,654 entitled "Account Management for Multiple Network Sites," filed Feb. 1, 2012.
U.S. Appl. No. 13/363,685 entitled "Logout From Multiple Network Sites," filed Feb. 1, 2012.
Canadian Examination Search for CA 2,861,384 (PCT/US2013/023818) mailed Apr. 9, 2015.
European Patent Office Search Report, EP Application No. 13743243, dated Sep. 9, 2015, pp. 1-6.
Japanese Office Action for JP 2014-555667 mailed Apr. 19, 2016.
Translation of Japanese Office Action for JP 2014-555667 mailed Apr. 19, 2016.
Translation of JP 2008282388 published Nov. 20, 2008.
Translation of JP 2005502931 published Jan. 27, 2005.
Translation of JP 2011505735 published Feb. 24, 2011.
Translation of JP 2008287701 published Nov. 27, 2008.
Translation of JP 2005346570 published Dec. 15, 2005.
Translation of JP 2002169782 published Jun. 14, 2002.

* cited by examiner

RECOVERY OF MANAGED SECURITY CREDENTIALS

CROSS REFERENCE TO RELATED APPLICATIONS

This application is a continuation of, and claims priority to, co-pending U.S. Patent Application entitled "RECOVERY OF MANAGED SECURITY CREDENTIALS," filed on Feb. 1, 2012, and assigned application Ser. No. 13/363, 681, which is incorporated herein by reference in its entirety.

The following application is related to U.S. Patent Application entitled "ACCOUNT MANAGEMENT FOR MULTIPLE NETWORK SITES" filed Feb. 1, 2012, having application Ser. No. 13/363,654, which issued as U.S. Pat. No. 8,745,705 on Jun. 3, 2014; to U.S. Patent Application entitled "AUTHENTICATION MANAGEMENT SERVICES" filed on Feb. 1, 2012, having application Ser. No. 13/363,664, which issued as U.S. Pat. No. 8,776,194 on Jul. 8, 2014; to U.S. Patent Application entitled "PRESENTING MANAGED SECURITY CREDENTIALS TO NETWORK SITES" filed on Feb. 1, 2012, having application Ser. No. 13/363,675, which issued as U.S. Pat. No. 8,819,795 on Aug. 26, 2014; and to U.S. Patent Application entitled "LOGOUT FROM MULTIPLE NETWORK SITES" filed on Feb. 1, 2012, having application Ser. No. 13/363,685, which issued as U.S. Pat. No. 8,863,250 on Oct. 14, 2014, which are incorporated herein by reference in their entirety.

BACKGROUND

Many web sites require users to log in with a username and password so that the users may be securely identified. Users, however, often forget their username and/or password that are required to log in to a web site. It is also common for users to use the same username and/or password for multiple web sites. Managing tens or even hundreds of usernames and passwords is a major cause of pain for users and results in excessive abandonment rates where users simply fail to sign up for a new service if it requires a new account.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
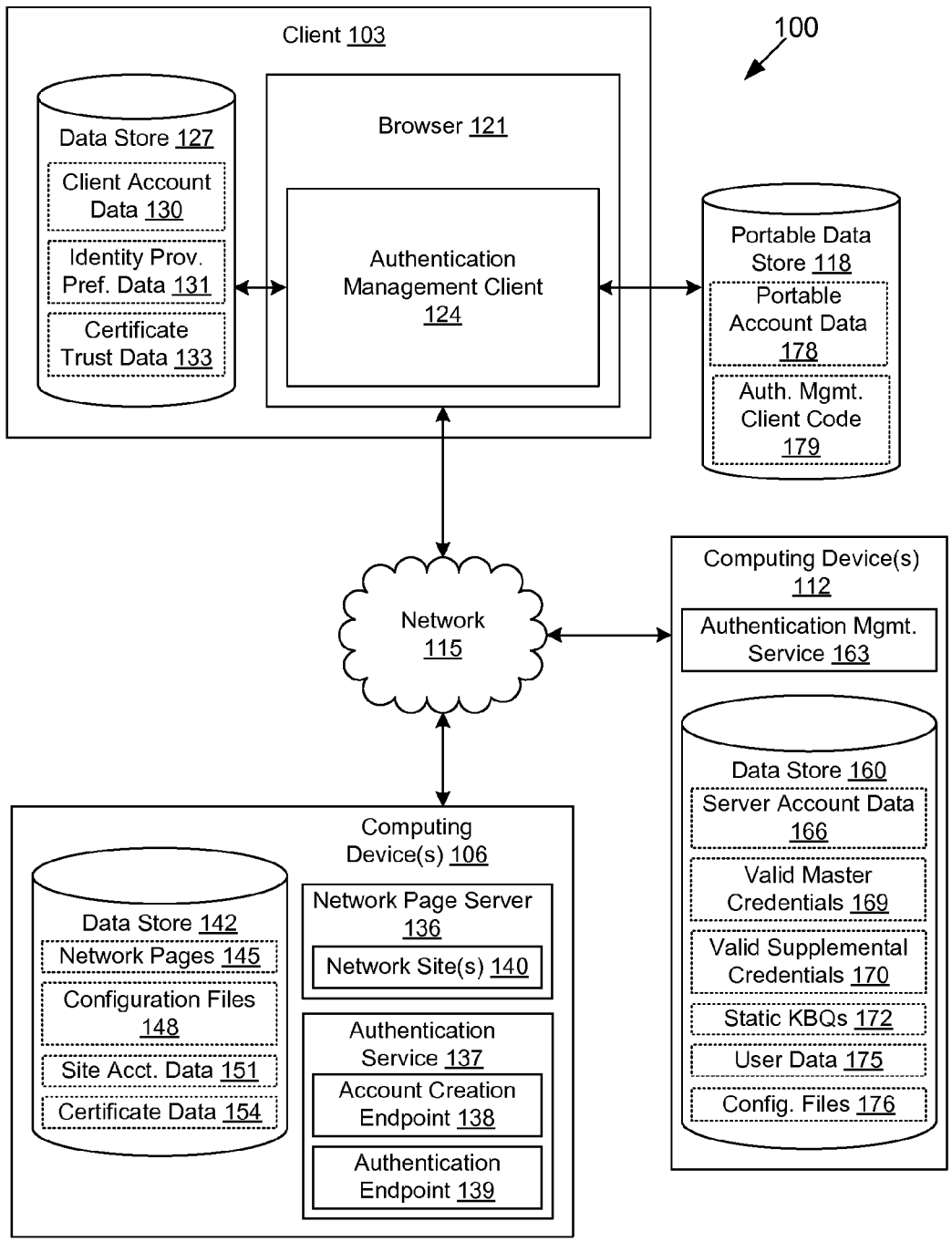
FIG. 1 is a drawing of a networked environment according to various embodiments of the present disclosure.

The present disclosure relates to managing security credentials such as usernames, passwords, security keys, and/or other security credentials. Although passwords may be a strong security credential when used properly, they are often misused. For example, a user may set a relatively weak password, such as a word from a dictionary or a password that is otherwise easy to guess. A user may also set the same password for multiple accounts across multiple network sites and with different security requirements. Thus, if one account is compromised, all other accounts using the same password are also vulnerable.

Thus, many problems associated with using passwords as a security credential are caused by humans being unable to process the type of data that passwords represent. Strong passwords often contain random characters and are long, which makes them hard to remember. Passwords are often not a single chunk of information and can stretch the limits of human working memory. The system disclosed herein largely separates the user from the password, thereby resolving many of the issues. For example, the system may automatically generate a unique, strong password for each network site, using characters selected from the entire set of characters acceptable by the network site. This can provide excellent resilience to brute force, rainbow table, and/or other attacks. In ordinary use, the user may not need to know the password for the network site. Further, the system may store the password on a server and make the password available to the user across multiple client devices, even on public-use client devices such as kiosks, etc. Access to the centrally stored passwords may be protected by knowledge-based questions, master passwords, and/or other approaches. Various techniques for strong credential lifecycle management are described by U.S. patent application Ser. No. 13/194,287 entitled "MANAGING SECURITY CREDENTIALS" and filed on Jul. 29, 2011, which is incorporated herein by reference in its entirety.

In various embodiments, accounts may be created automatically by an authentication management client providing a base set of information about a user to an account creation endpoint of a network site or identity provider. Accounts may be upgraded as necessary by providing additional information to access certain secured resources. Multiple users may be able to login to the authentication management client, which may allow the users to create respective accounts and to access secured resources of network sites by authenticating using the authentication management client. In some embodiments, multiple authentication management services may be available, and may be offered potentially by competing entities. Some network sites or identity providers may support some of the authentication management services but not others. Users may migrate from one authentication management service to another.

In various embodiments, an authentication management client presents security credentials to network sites (or identity providers) according to a domain name of the network site using domain name matching or other groupings. Some network sites may support authentication using multiple identity providers. Users may store preferences for preferred identity providers to be used by an authentication management client where multiple identity providers are available. In some situations, accounts and security credentials managed by an authentication management service may be recovered and used only by preauthorized clients. Also, credentials may be changed or exported to facilitate use outside of the authentication client. In some embodiments, where the authentication client facilitates logging into multiple network sites using multiple accounts, the authentication client may be configured to provide automatic logout functionality for the multiple network sites. In the following discussion, a general description of the system and its components is provided, followed by a discussion of the operation of the same.

With reference to FIG. 1, shown is a networked environment 100 according to various embodiments of the present disclosure. The networked environment 100 includes a client 103 that may be in data communication with computing devices 106, and computing devices 112 by way of a network 115. The network 115 includes, for example, the Internet, intranets, extranets, wide area networks (WANs), local area networks (LANs), wired networks, wireless networks, or other suitable networks, etc., or any combination of two or more such networks. The client 103 may also be in data connection with a portable data store 118 by way of, for example, a local interface, data bus, or another network 115.

The client 103 may comprise, for example, a computer system such as a desktop computer, a laptop computer, personal digital assistants, cellular telephones, smartphones, set-top boxes, music players, web pads, tablet computer systems, game consoles, electronic book readers, kiosks, or other devices with like capability. Further, the client 103 may also comprise any device that is network capable that may communicate with the computing devices 106, 112 over the network 115 to perform various functions. Such clients 103 may comprise, for example, processor-based devices having processor circuits comprising a processor and a memory.

The client 103 may be configured to execute various applications such as a browser 121, an authentication management client 124, and/or other applications. The browser 121 may be executed in a client 103, for example, to access and render network pages, such as web pages, gopher pages, mobile application content, or other forms of network content served up by the computing devices 106 and/or other servers. The authentication management client 124 may be executed to manage user accounts for network sites and identity providers, including usernames, passwords, private and public keys, certificates, and/or other security credentials.

In some embodiments, the authentication management client 124 runs as a plug-in application to the browser 121. For example, the authentication management client 124 may be implemented as a toolbar for the browser 121. Authentication management clients 124 may be implemented in hypertext markup language (HTML) version 5, or another language. In other embodiments, the authentication management client 124 may be a standalone application that interfaces with the browser 121, mobile applications, and/or other applications requiring management of authentication. The client 103 may be configured to execute applications beyond the browser 121 and the authentication management client 124 such as, for example, e-mail applications, instant message applications, and other applications.

The client 103 includes a data store 127, and potentially other data stores, which may comprise data and applications configured to provide access to the data. The data store 127 may be used to store client account data 130, identity provider preference data 131, certificate trust data 133, and/or potentially other data. The client account data 130 may include, for example, security credentials used to access various network sites or network pages, information regarding authentication endpoints, and/or other information. In various embodiments, client account data 130 may be stored in an encrypted format. In various embodiments, client account data 130 may be stored ephemerally such that the security credentials are erased upon expiration of a session of the authentication management client 124. In one embodiment, the data store 127 may store an encrypted key that may be decrypted in response to a master security credential obtained from the user. The decrypted key may then be used to decrypt the client account data 130.

The client account data 130 may also include a set of information about the user that may be employed by the authentication management client 124 in automatically creating or upgrading an account. Such information may include, for example, first name, last name, middle initial or middle name, email address, phone number, physical address, date of birth, and/or other information. The stored user information may be divided into more sensitive sets and less sensitive sets, which may be highlighted when a user provides consent to share the information. In one embodiment, information deemed less sensitive may be shared by default to create or upgrade accounts. If user information is requested for account creation or upgrade but is not stored in the client account data 130, a form may be rendered for the user to provide the missing information. In one embodiment, a "base" set of information may be defined by a standard.

The identity provider preference data 131 may indicate user preferences for identity providers to be used by the authentication management client 124 where multiple identity providers are available for a network site. Certificate trust data 133 may describe trusted certificate authorities that issue digital certificates used by network sites. Certificate trust data 133 may comprise, for example, public keys associated with the trusted certificate authorities. The public keys may be used to validate the digital signature of a trusted certificate authority on a digital certificate.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

The computing device 106 is configured to execute various applications such as, for example, a network page server 136, an authentication service 137 having an account creation endpoint 138 and an authentication endpoint 139, and other applications. The network page server 136 is configured to serve up network pages, such as web pages, and other data from the computing device 106 to various clients 103. The network page server 136 may be configured to send network pages by hypertext transfer protocol (HTTP), hypertext transfer protocol secure (HTTPS), or some other protocol. The network page server 136 may employ encryption using, for example, secure sockets layer (SSL), transport layer security (TLS), and/or some other approach. Non-limiting examples of network page servers 136 include Apache® HTTP Server, Apache® Tomcat, Microsoft® Internet Information Services (IIS), and other server applications.

The network page server 136 may be configured to serve up one or more network sites 140. Such a network site 140 is said to be hosted by the network page server 136. A network site 140 may include a set of network pages and/or files associated with a domain name, such as a canonical name, and a directory, such as a root directory (i.e., "/") or some other directory. Each network site 140 may be associated with distinct configuration settings in the network page server 136, while other default configuration settings may be shared across network sites 140.

The authentication service 137 is executed to facilitate account creation and authentication. The authentication service 137 may be operated by the network site 140 or may be employed by multiple network sites 140. Where the authentication service 137 is employed by multiple network sites 140, the authentication service 137 may be referred to as an identity provider. As an identity provider, the authentication service 137 may be used by many different network sites 140 operated by many different entities. In some cases, a network site 140 may support multiple authentication services 137 or identity providers. In various embodiments, the network sites 140 and the authentication services 137 may be executed in the same computing device 106 or in different computing devices 106.

The account creation endpoint 138 may comprise a network page and/or software configured to facilitate creation of one or more accounts and/or the establishment of security credentials for existing accounts for one or more users at a client 103 for one or more network sites 140 using an account creation protocol. In various embodiments, the authentication management client 124 communicates with the account creation endpoint 138 through the network page server 136. To this end, the account creation endpoint 138 may be a plug-in or other module of the network page server 136, a script or other software embedded within a network page or otherwise within a network site 140 and executed by way of an interpreter or a common gateway interface, or accessed in some other way through the network page server 136. In other embodiments, the account creation endpoint 138 may be a server application executing on the same or a different computing device 106 as the network page server 136.

The authentication endpoint 139 may comprise a network page and/or software configured to facilitate authentication of a user at a client 103 for one or more network sites 140. In various embodiments, the authentication management client 124 communicates with the authentication endpoint 139 through the network page server 136. To this end, the authentication endpoint 139 may be a plug-in or other module of the network page server 136, a script or other software embedded within a network page or otherwise within a network site 140 and executed by way of an interpreter or a common gateway interface, or accessed in some other way through the network page server 136. In other embodiments, the authentication endpoint 139 may be a server application executing on the same or a different computing device 106 as the network page server 136.

The computing device 106 includes a data store 142 and potentially other data stores, which may comprise data and applications configured to provide access to the data. The data store 142 may be used to store network pages 145, configuration files 148, site account data 151, certificate data 154, and/or potentially other data. Network pages 145 may include the network pages and/or files served up for the network sites 140 hosted by the network page server 136. Configuration files 148 may include one or more security credential specifications and/or describe an interface of one or more account creation endpoints 138 and/or authentication endpoints 139. Site account data 151 comprises security credentials and/or other data associated with users of one or more network sites 140. Certificate data 154 comprises digital certificates that may be used by the network page server 136, the authentication endpoint 139, and/or other applications on the computing device 106 to identify a network site and/or encrypt data.

The computing device 112 may comprise, for example, a server computer or any other system providing computing capability. Alternatively, a plurality of computing devices 112 may be employed that are arranged, for example, in one or more server banks or computer banks or other arrangements. For example, a plurality of computing devices 112 together may comprise a cloud computing resource, a grid computing resource, and/or any other distributed computing arrangement. Such computing devices 112 may be located in a single installation or may be distributed among many different geographical locations. For purposes of convenience, the computing device 112 is referred to herein in the singular. Even though the computing device 112 is referred to in the singular, it is understood that a plurality of computing devices 112 may be employed in the various arrangements as described above.

Various applications and/or other functionality may be executed in the computing device 112 according to various embodiments. Also, various data is stored in a data store 160 that is accessible to the computing device 112. The data store 160 may be representative of a plurality of data stores 160 as can be appreciated. The data stored in the data store 160, for example, is associated with the operation of the various applications and/or functional entities described below.

The components executed on the computing device 112, for example, include an authentication management service 163 and other applications, services, processes, systems, engines, or functionality not discussed in detail herein. The authentication management service 163 is executed to provide access to security credentials stored by the computing device 112 in association with a user account with a network site 140. In various embodiments, the authentication management service 163 may be configured to generate user accounts and/or establish security credentials with the network site 140 on behalf of a user at a client 103. In various embodiments, the authentication management service 163 may authenticate clients 103 using a master security credential and/or knowledge-based questions.

In one embodiment, the authentication management services 163 are registered in a directory of such services. Such a directory may be maintained by an impartial third party. The authentication management services 163 may be differentiated with respect to one another. Some authentication management services 163 may, for example, offer a privacy-friendly service that ensures users that their browsing habits are not being profiled by the authentication management service 163. Other authentication management services 163 may choose to track logins performed by the authentication management client 124. Users may be able to migrate their account data from one authentication management service 163 to another authentication management service 163 by way of a migration protocol.

The data stored in the data store 160 includes, for example, server account data 166, valid master credentials 169, valid supplemental credentials 170, static knowledge-based questions 172, user data 175, configuration files 176, and potentially other data. The data stored in the data store 160 may be partitioned into user-specific data and global data. The server account data 166 includes security credentials for users for authentication to network sites 140. Such security credentials may be stored in an encrypted form or a non-encrypted form. The server account data 166 may also include information regarding account creation endpoints 138, authentication endpoints 139 and/or other information. The authentication management clients 124 may be configured to update and synchronize the server account data 166 with the client account data 130 frequently to ensure freshness when the user logs in via multiple clients 103.

The valid master credentials 169 are employed to authenticate users for the authentication management service 163. In one example, the valid master credentials 169 may correspond to hashed versions of a master security credential established by users. The valid supplemental credentials 170 correspond to supplemental credentials that may also be employed to authenticate users for the authentication management service 163. Unlike the master security credential, a combination of one or more valid supplemental credentials 170 along with correct answers to one or more knowledge-based questions may be needed for a user to be authenticated. Respective weights may be applied to each component of a score used to determine authentication.

The static knowledge-based questions 172 correspond to knowledge-based questions for which the user has preconfigured an answer. Such questions may be selected by the user or may be preselected. The user data 175 corresponds to various data associated with users. Such user data 175 may relate to purchase transactions of a user with an online retailer, browsing history, order history, search history, profile information, and/or other data. The user data 175 may be employed to generate dynamic knowledge-based questions as will be described. The user data 175 may correspond to data describing the interactions of a user with a network site 140 in some embodiments.

The configuration files 176 may include one or more security credential specifications and/or describe an interface of one or more account creation endpoints 138 and/or authentication endpoints 139. While the data in the data store 160 that has been previously discussed has been of a user-specific nature, the configuration files 176 may be non-user specific and thus may be considered global data.

The portable data store 118 may comprise, for example, a universal serial bus (USB) flash storage device, a solid-state storage device, a portable hard disk, a floppy disk, an optical disc, and/or other portable storage devices. In various embodiments, the portable data store 118 may include a processor circuit comprising a processor and a memory. In other embodiments, the portable data store 118 may merely consist of a non-transitory computer-readable storage medium. The portable data store 118 may be removably attached to the client 103 in some embodiments.

The portable data store 118 may be configured to store portable account data 178, authentication management client code 179, and/or other data. The portable account data 178 may include, for example, security credentials used to access various network sites 140 or network pages 145, information regarding authentication endpoints 139, master security credentials to decrypt the client account data 130, and/or other information. In various embodiments, the portable account data 178 may be a mirror of the client account data 130 or the server account data 166. In other embodiments, the portable account data 178 may take the place of client account data 130 or the server account data 166. The portable account data 178 may be stored in an encrypted format.

To this end, the portable data store 118 may include a device (e.g., a fingerprint scanner or other biometric recognition device, a pin pad, etc.) used to authenticate a user in order to provide access to the data on the portable data store 118, such as portable account data 178; or it may include hardware and/or software to permit a user to enter a password and/or decryption key in order to provide access to the data on the portable data store 118. Additionally, in some embodiments, the authentication management client 124 may be stored as authentication management client code 179 on the portable data store 118 and executed in the client 103, for example, when the portable data store 118 is attached to the client 103.

Next, a general description of the operation of the various components of the networked environment 100 is provided. To begin, a user may install authentication management client 124 onto the client 103 and preconfigure the operation of the authentication management client 124 for existing accounts associated with network sites 140. For example, the user may provide to the authentication management client 124 and/or the authentication management service 163 existing security credentials such as, for example, usernames, passwords, security keys, certificates, and/or other security credentials along with identifying information for the network sites 140 and/or uniform resource locators (URLs) associated with the security credentials. The authentication management client 124 may be associated with one or more of multiple authentication management services 163. The authentication management clients 124 may or may not interact with the authentication management services 163 by way of a standard authentication management protocol. In some cases, the authentication management client 124 may show some logo or other branding associated with a corresponding authentication management service 163.

The user may also configure a master security credential such as, for example, a username, password, biometric identification, etc. for the authentication management client 124 so that the security credentials may be encrypted or otherwise protected from use or view on the client 103 without the authorization of the user. In one embodiment, upon installation of the authentication management client 124, the authentication management client 124 encrypts the client account data 130 using a randomly-generated, high-entropy master key. This master key may, in turn, be encrypted to a user-specified master key, which may be stored along with the client account data 130 to allow for local decryption. In some embodiments, access to the operating system user session in the client 103 may provide access to the client account data 130 without a separate user login. In one embodiment where the client 103 executes the Windows® operating system, the master security credential may be stored in "Credential Manager."

Where the security credentials are stored in the server account data 166 of the computing devices 112, the user may establish a valid master credential 169 with the authentication management service 163. In one embodiment, the server account data 166 for the user may be stored in an encrypted form. In one embodiment, the server account data 166 for the user is encrypted using a security credential generated as the result of an SSL/TLS session between the client 103 and the computing device 112, e.g., a Rivest Cipher 4 (RC4) symmetric key or some other security credential. The encryption may be performed in the authentication management client 124 so that security credential details are not given in the clear to the authentication management service 163. In some cases, the user may configure answers to static knowledge-based questions 172 with the authentication management service 163.

The account information may be stored by the authentication management client 124 in client account data 130 on the client 103 and/or at some other location. For example, the authentication management client 124 may back up the account information to account data 160 located on the computing device 106, portable account data 178 located on in the portable data store 118, and/or another location. Various techniques relating to storage of the account information on the client 103 are described by U.S. patent application Ser. No. 12/539,886 entitled "AUTHENTICATION MANAGER" and filed on Aug. 12, 2009, which is incorporated herein by reference in its entirety.

In some embodiments, the account information may be centrally hosted in the server account data 166 of the computing devices 112. When the computing devices 112, the portable data store 118, or other storage locations are used to store account information, a user may be able to use the authentication management client 124 and the account information on another client 103. To this end, the authentication management client 124 may be, for example, downloaded, configured, and loaded automatically on another client 103. Additionally, various functions that are described as being performed by the authentication management client 124 may instead be performed by the authentication management service 163. For example, the authentication management service 163 may be configured to create accounts, regenerate security credentials, etc. in place of the authentication management client 124. The authentication management client 124 in some cases may be characterized as a client application of the authentication management service 163.

Security credentials may be shared among multiple users of the authentication management client 124. As a non-limiting example, several users in an organization may share an online banking account. A first user may create a username and password for the account using the authentication management client 124 and/or the authentication management service 163. The first user may mark the account as shared and provide a list of users that are authorized to access the account, including a second user. When the account is distributed to client account data 130, server account data 166, portable account data 178, it may be secured such that only the authorized users can access it. When the second user next uses the authentication management client 124, the second user may be given the opportunity to synchronize the new account with portable account data 178 located in the portable data store 118 belonging to the second user or in some other location.

During the installation process, in one embodiment, the user may specify whether the authentication management client 124 is to operate as a browser 121 plug-in or as a standalone application. The authentication management client 124 may be installed and configured for a plurality of browsers 121 such as Firefox®, Internet Explorer®, Safari®, Chrome®, and/or other browsers 121. The authentication management client 124 may also be configured for a plurality of users on the client 103.

When a user accesses a network site 140 with the browser 121 or another application, the authentication management client 124 determines whether the network site 140 is associated with stored account information, which may be stored, for example, centrally in the server account data 166 or locally in the client account data 130. The authentication management client 124 may communicate with an authentication service 137 of the network site 140 or of a separate identity provider.

The authentication management client 124 may refer to the domain name of the network site 140 in order to correlate a stored account with the network site 140. In some cases, multiple network sites 140 having different domain names may use the same stored account. Sometimes, this determination may be based on a portion of the domain name, such as the second-level domain portion. As a non-limiting example, a company may have several network sites 140 with different domain names for various geographic locales or generic top-level domains, e.g., "e-retailer.com," "e-retailer.net," "e-retailer.co.uk," "e-retailer.eu," "e-retailer.co.jp," and so on. The authentication management client 124 may identify the user account according to the string "e-retailer" being in the domain name, rather than an exact match of the domain name. However, the matching may not be dispositive, and the network sites 140 may in fact be unrelated. Accordingly, the identification of the account may be presented to the user for explicit confirmation before any secured information from a stored account is exchanged with the network site 140.

If the network site 140 is not associated with stored account information, then the authentication management client 124 may notify the user and may prompt the user to provide security credentials if the user has an existing account. The user-provided security credentials may then be stored by the authentication management client 124 in one or more of client account data 130, server account data 166, or portable account data 178.

Alternatively, or additionally, the authentication management client 124 and/or the authentication management service 163 may assist the user in creating an account for the network site 140. The account may be a one-time account, a first account for the user, or a second or subsequent account for the user. The authentication management client 124 and/or the authentication management service 163 may determine how to create an account for a network site 140 based, for example, on the structure of a form embedded within a network page 145. Such a form may be defined in hypertext markup language (HTML), extensible markup language (XML), or some other language.

As a non-limiting example, the authentication management client 124 may identify an account creation form when a submit input element on a network page 145 is associated with text such as "Create Account." The authentication management client 124 may also examine the URL for relevant keywords. As another non-limiting example, the authentication management client 124 may identify an account creation form when a challenge response test (e.g., a "Captcha") is present. The authentication management client 124 may automatically identify required fields for security credentials using, for example, input elements on a network page 145 named "username," "password," or other identifiable names. In various embodiments, the authentication management client 124 may have the user identify the account creation form and/or tag input elements of the form so that the authentication management client 124 may accurately identify how the account may be created with form filling. Such a list of tags can be stored in a configuration file 176 which may then be uploaded to a computing device 112. There, the configuration file 176 can be accessed by other users using the authentication management client 124 and used by them to simplify account creation on the network site 140 described by the configuration file 176. Alternatively, or additionally, configuration files 176 may be stored by the computing device 112 to be accessed by the authentication management client 124, the authentication management service 163, and/or other applications.

In various embodiments, the authentication management client 124 and/or the authentication management service 163 may create the account in an automated way through methods other than form filling. For example, the authentication management client 124 and/or the authentication management service 163 may obtain a configuration file 148 associated with the network site 140 from either the network page server 136 for the network site 140 or a computing device 112 that may provide a configuration file 176 associated with the network site 140. The configuration file 148, 176 may define one or more account creation endpoints 138 for the network site 140 where the authentication management client 124 and/or the authentication management service 163 may authenticate and/or create an account other than by filling out a form. For example, the configuration file 148, 176 may define the URL, parameters, encoding, and/or other information required to create an account in an automated way through an account creation endpoint 138. In some embodiments, one account creation endpoint 138 may be shared by multiple network sites 140 and/or network page servers 136. To prevent unauthorized automatic creation of accounts, the authentication management client 124 and/or the authentication endpoint 139 may include "Captchas," limit velocity of account creation, and/or take other measures.

The configuration file 148, 176 may also include a security credential specification associated with the network site 140. The security credential specification may specify a character set, minimum length, maximum length, and/or other parameters for usernames and/or passwords. The security credential specification may also specify minimum key length, acceptable algorithms and formats, and/or other parameters applicable to public key infrastructure or other types of security credentials.

The authentication management client 124 and/or the authentication management service 163 may generate one or more security credentials based on the security credential specification. In one embodiment, the authentication management service 163 may be configured to obtain the security credential specifications according to a subscription-based push model. In another embodiment, the authentication management service 163 may be configured to pull the security credential specifications from the computing device 106 at regular intervals.

When the authentication management client 124 and/or the authentication management service 163 is creating an account by form filling, the authentication management client 124 may prompt the user to supply a security credential specification so that the authentication management client 124 and/or the authentication management service 163 may generate one or more security credentials to be filled in on the form. The user may see information regarding required attributes for security credentials displayed on the network page 145 near the account creation form. The authentication management client 124 may provide options including, but not limited to, length of the security credential, directions to use a certain character set, directions to use at least one number, directions to use at least one non-alphanumeric character, and other options.

As a non-limiting example, the authentication management client 124 may present a graphical interface to the user listing various attributes that may be used in generating the security credentials. Such a graphical interface may include, for example, checkboxes, radio buttons, drop-down boxes, text fields, text areas, etc. The graphical interface may be preconfigured with default selections. Where the security credentials are generated by the authentication management service 163, the authentication management service 163 may perform the form filling, or the security credentials may be transferred to the authentication management client 124 for the authentication management client 124 to perform the form filling.

In various embodiments, when the authentication management client 124 is creating an account by form filling, the authentication management client 124 may replace, for example, the normal user interaction in filling out the form with a wizard interface. The wizard interface may omit tasks or fields that may be done automatically by the authentication management client 124. However, the wizard interface may obtain input from the user in order to fill out fields such as "Captchas" and other challenge response tests. Although the authentication management client 124 and/or the authentication management service 163 may be configured to fill out fields pertaining to other personal information (e.g., name, date of birth, social security number, phone number, address, etc.), the authentication management client 124 may instead be configured to prompt the user for that information. In various embodiments, the authentication management client 124 may leave unrecognized form fields blank for the user to complete.

Accordingly, the authentication management client 124 and/or browser 121 sends an account creation request associated with the generated security credential to the network site 140. After the account creation request is submitted, the account will either be created or not created for the network site 140. The network site 140 typically provides a response page indicating whether the account creation was successful. Such a network page 145 may be parsed automatically by the authentication management client 124 or may be left for additional user input to the authentication management client 124.

In some cases, the response page will include another form with an indication that there was a problem. As a non-limiting example, a username field may be highlighted with an explanation that the specified username was already taken. The authentication management client 124 may be configured to respond automatically to such requests and/or to seek user input. Account creation responses through an authentication endpoint 139 may be handled by the authentication management client 124 in an analogous way. In one embodiment, the authentication management client 124 may simply assume that the account was created.

Responsive to account creation, the authentication management client 124 and/or the authentication management service 163 store the account information including, but not limited to, security credentials, URLs, and domain names associated with the account and network site 140, in one or more of client account data 130, server account data 166, or portable account data 178. In particular, the network site 140 or authentication endpoint 139 may present a trusted certificate from certificate data 154 during the account creation process. Information relating to this trusted certificate, including domain name, certificate authority, and other information from the certificate, may be stored with the account information.

The account information may consequently be marked as usable on a network site 140 corresponding to the domain name provided in the trusted certificate, or only for a network site 140 able to present that specific certificate in higher assurance environments. Account information stored in any of client account data 130, server account data 166, or portable account data 178 may be manually or automatically copied by the authentication management client 124 and/or the authentication management service 163 to any other client account data 130, server account data 166, or portable account data 178 so that the account information may be mirrored across any two or more of client account data 130, server account data 166, or portable account data 178.

For purposes of backup, the authentication management client 124 and/or the authentication management service 163 may be capable of rendering a list of the stored account information in client account data 130, server account data 166, or portable account data 178 for viewing or printing. To facilitate viewing or printing, the authentication management client 124 and/or the authentication management service 163 may be configured to generate human readable or printable security credentials using an appropriate character set. Alternatively, the authentication management client 124 and/or the authentication management service 163 may encode security credentials in a printable form using an encoding approach such as, for example, UUencoding, BinHex, Multipurpose Internet Mail Extensions (MIME) encodings, Base64, and other encoding approaches.

Additionally, for purposes of recovery, the master security credential may be written to removable media such as a Universal Serial Bus (USB) key. To improve security in recovery cases, the master security credential may be encrypted to a secret stored in the client 103. This ensures that a lost USB key or other removable media cannot be used to access the server account data 166. In some embodiments, recovery could be something implemented at least in part by the operating system by tying the master security credential to the user account in the operating system.

To enable roaming and recovery, a set of one-time passwords may be generated by the authentication management client 124. Each of these may be used to generate additional encrypted versions of the master security credential, each of which may be appended to the server account data 166. The one-time password may be enforced by the authentication management client 124 removing each entry from the server account data 166 as it is used. The user may be responsible for keeping these one-time passwords somewhere outside of the system (e.g., on a print out, wallet card, etc.)

In some embodiments, recovery and reset capabilities may be managed on a per-machine basis by the authentication management service 163. In one embodiment, only the first client 103 for a given authentication management account may be capable of recovery. The authentication management service 163 could provide a user interface to manage clients 103, including the ability to allow recovery/reset at additional clients 103. Further, different types of account data recovery mechanisms may be supported (e.g., one-time passwords, operating system recovery, credential stored on removable media, etc.), and a subset of these account data recovery mechanisms may be enabled or disabled on a per-client basis. For example, the authentication management client 124 may be configured to request permission to use a particular one of the account data recovery mechanisms. Such a request may include a client-identifying token.

The authentication management service 163 may enable or disable the requested account data recovery mechanism according to whether authorization has been granted to the particular client 103. As a non-limiting example, a first registered client 103 (e.g., a home machine) may be able to use all recovery mechanisms, but by default, none of the recovery mechanisms may be available for use on other clients 103 (e.g., a friend's machine). This may be used to preempt the possibility of security attacks through such recovery mechanisms. An interface with the authentication management service 163 may be provided for a user to selectively enable or disable particular recovery mechanisms for particular clients 103.

To facilitate recovery of a lost master security credential, the master security credential may be written to a portable data store 118 or other removable media. To improve security in such a situation, the master security credential may be encrypted to a key that is stored in the client 103 so that the master security credential may be decrypted only at the client 103, even if the portable data store 118 or removable media is stolen. In some embodiments, the master security credential may correspond to an operating system credential that is managed by the operating system.

In some embodiments, a set of one-time passwords may be generated by the authentication management client 124, and each of these may be used to generate additional encrypted versions of the master security credential, each of which may be appended to the client account data 130 and server account data 166. To enforce the one-time passwords, each entry is removed by the authentication management client 124 from the client account data 130 as it is used. The user may be responsible for keeping these one-time passwords secure outside the system (e.g., on a print out, on a wallet card, etc.).

When a stored account exists for a network site 140, the authentication management client 124 and/or the authentication management service 163 determines whether to provide the security credentials to the network site 140. As a preliminary matter, the authentication management client 124 and/or the authentication management service 163 may require that the user be authenticated to the authentication management client 124 and the authentication management service 163 by way of a master security credential such as a password, presence of the portable data store 118 at the client 103, biometric identification, native operating system identification, or some other authentication. Responsive to authentication, the authentication management client 124 may decrypt the stored client account data 130, server account data 166, or portable account data 178. In some embodiments, the authentication management client 124 may be given access to the stored client account data 130, server account data 166, or portable account data 178 responsive to providing a master security credential. The authentication management client 124 then verifies the identity of the network site 140.

Verifying the identity of the network site 140 may be performed, for example, by comparing a domain name associated with a trusted certificate provided by a network site 140 at the time of logon with the domain name associated with the network site 140 in the stored account information. The authentication management client 124 may compare the domain name associated with the trusted certificate provided by the network site 140, for example, with a domain name provided by a user, a domain name inferred by heuristic analysis, or some other domain name, in order to identify which stored account the network site 140 appears to resemble. Verifying the identity of the network site 140 through the use of trusted certificates may be less susceptible to spoofing attacks than by verifying the identity merely through domain name service (DNS) name resolution, for example, or comparing a stored domain name to what is displayed in the address bar of the browser 121.

If the network site 140 provides no certificate (e.g., authentication under HTTP) or if the certificate is not trusted (e.g., self-signed or issued by a certificate authority not considered to be trusted in the certificate trust data 133), the authentication management client 124 may display a warning to the user. In some cases, the user may accept the warning and continue. In some embodiments, the authentication management client 124 may remember such characteristics and use them to aid in future identity verification of the network site 140. In other cases, the authentication management client 124 may identify a clear use of a spoofing attack or other phishing attempt and provide additional warnings, disable authentication at the particular network site 140, require reauthentication by the user to the authentication management client 124, and/or take other precautions. Additionally, by integrating the authentication management client 124 with a site providing reputation data for network sites 140, the authentication management client 124 can warn the user that a network site 140 is hostile.

The authentication management client 124 may additionally verify the identity of the network site 140 by other methods. One verification method may comprise comparing the contents of the address bar in the browser 121 with a stored URL or domain name. A second verification method may comprise comparing contents of the HTTP headers sent by the accessed network site 140 with a stored URL or domain name. A third verification method may comprise performing a reverse DNS look-up on an Internet Protocol (IP) address associated with the accessed network site 140 and comparing that domain name with a stored URL or domain name. Other verification methods may also be employed. More secure methods may be employed prior to downgrading to less secure methods, and the user may specify acceptable methods of proving the identity of network sites 140.

Once the identity of a network site 140 is verified, the authentication management client 124 may provide the security credentials to the network site 140 automatically through an authentication endpoint 139 or may obtain user confirmation. If the authentication management client 124 is configured to obtain user input, the authentication management client 124 may render a button or other user interface feature in or on top of the browser 121 to obtain confirmation.

When no authentication endpoint 139 is defined for a network site 140, the authentication management client 124 may be configured to detect whether an authentication form is presented. The authentication management client 124 may examine the network page 145 for elements such as a submit input element associated with text such as "Log In," input fields matching "username" and/or "password," fields using the password type, and other identifying elements. The authentication management client 124 may also examine the URL for relevant keywords. In some embodiments, the authentication management client 124 and/or the authentication management service 163 may store a URL associated with the network site 140 in client account data 130, server account data 166, or portable account data 178, which may be used for authentication. The authentication management client 124 may provide the security credentials to the network site 140 by form filling. The submission of such a form may be automatic or may be subject to user input such as selection of a "Submit" or "Log In" button or other user interface element.

In some cases, the user may forget the master security credential or may not have access to the master security credential on another client 103. The user may then be able to either reset the master security credential, or gain at least temporary access to stored security credentials, through a procedure implemented by the authentication management service 163. Upon a user selecting a master security credential or reset option, the authentication management service 163 may generate a user interface providing one or more knowledge-based questions. For example, the user interface may correspond to a network page for rendering in the browser 121. Alternatively, data may be sent to the authentication management client 124 in order for a user interface to be rendered by the authentication management client 124.

The user interface may present static knowledge-based questions 172 that are preconfigured by the user. For example, the user interface may present a question of "What is your mother's maiden name?," "In what city were you born?," "What was the mascot of your high school?," and so on. The user interface may present true questions or false questions. True questions correspond to questions that can be validated by both the user and the authentication management service 163 that are unique to the user. False questions are those designed to catch an attacker who is attempting gain unauthorized access to the security credentials. For example, a false question may be: "What was the last payment amount for the truck you lease?" where the correct answer should be: "I do not have a truck."

Furthermore, the user interface may present knowledge-based questions that are dynamically generated by the authentication management service 163. With dynamically generated questions, the user may have no foreknowledge as to what type of questions will be asked. Dynamically generated questions may employ user data 175 including unique customer information such as purchase transaction history and/or other data. One example of a dynamically generated question may be: "I see that you purchased an item from E-Retailer yesterday, can you tell me the bill amount?"

Multiple knowledge-based questions may be presented in a user interface. The answers to the knowledge-based questions may be used by the authentication management service 163 to generate a score. When the score meets a predefined threshold (e.g., one question answered correctly, three questions answered correctly, one dynamically generated question based on recent data answered correctly, etc.), the user may be granted access to the stored security credentials of the server account data 166 and/or access to establish a new valid master credential 169. It is noted that different weighting may be applied to different types of questions in generating a score. For example, dynamic questions based on a recent event may be given a greater weight than a static question based on information obtained during account creation. In the case of new or infrequent users for whom insufficient user data 175 is present for dynamically generated questions, the authentication management service 163 may fall back to employ the static knowledge-based questions 172.

Once a user is authenticated by the authentication management service 163 through the use of knowledge-based questions, or through a valid master security credential, security credentials of the user from the server account data 166 may be downloaded to the client account data 130 for use by the authentication management client 124. In one example, the client 103 corresponds to a kiosk or another public-use client 103. In such an example, the security credentials may be maintained ephemerally in the memory of the client 103 such that they are erased from memory when the user logs out, exits the browser 121, or otherwise ends the session of the authentication management client 124. Alternatively, the security credentials may be saved to the client account data 130 for future use through the client 103.

Moreover, once a user is authenticated by the authentication management service 163, the user may be presented with an opportunity to set a new security credential. For example, the user may supply the new security credential with or without the previous security credential. The valid master credentials 169 are updated by the authentication management service 163 to store the new valid master credential 169. It is noted that the valid master credential 169 may be hashed or otherwise encoded.

The authentication management service 163 may also be employed to generate or regenerate security credentials according to security credential specifications in the configuration files 176. In addition to initial account creation and configuration, the authentication management service 163 may be configured to regenerate security credentials periodically or when triggered by a user or administrator. For example, an administrator may trigger an automatic regeneration of security credentials for many users with accounts for a certain network site 140 in response to a potential security compromise. Upon regeneration of the security credentials, the authentication management service 163 may establish the newly generated security credentials with the various network sites 140 using the appropriate account creation endpoint 138. The authentication management service 163 may supply a previous security credential to facilitate establishing the newly generated security credential. The security credentials may be generated or regenerated to have a maximum security strength allowed by the security credential specification.

Where multiple authentication management services 163 are available, authentication management clients 124 may be configured to import/export the client account data 130 for use with different authentication management services 163. Authentication management clients 124 may be deployed by different providers of authentication management services 163 or by other parties. In some embodiments, a particular authentication management client 124 may function only with a corresponding authentication management service 163. Thus, the authentication management client 124 may be configured to allow import and export of client account data 130 to different authentication management clients 124 for use with different authentication management services 163.

In one embodiment, the authentication management service 163 may provide a revocation user interface in order to revoke security credentials associated with the server account data 166. To facilitate this central revocation, the security credentials in the server account data 166 may be token based, and not based on literal storage of user credentials. Revocation and reset may be performed by the authentication management client 124 in some embodiments. For example, the authentication management client 124 may include a "reset all credentials" function that would automatically reset each credential to a newly generated credential. Knowledge-based questions may be asked of the user to provide an additional check on the identity of the user before performing the automatic credential resets.

In addition to credential resets, the authentication management client 124 may support credential changes to user-specified passwords, etc. Such support may be useful in the case of a user going on vacation without access to the authentication management client 124. The user may want to change the automatically generated security credentials to a single temporary password that may be easy to remember. After returning from vacation, the user may reset the temporary password to new automatically generated security credentials. In one embodiment, the single temporary password may have an expiration period, to be enforced by the authentication management service 163.

Figure 2A:
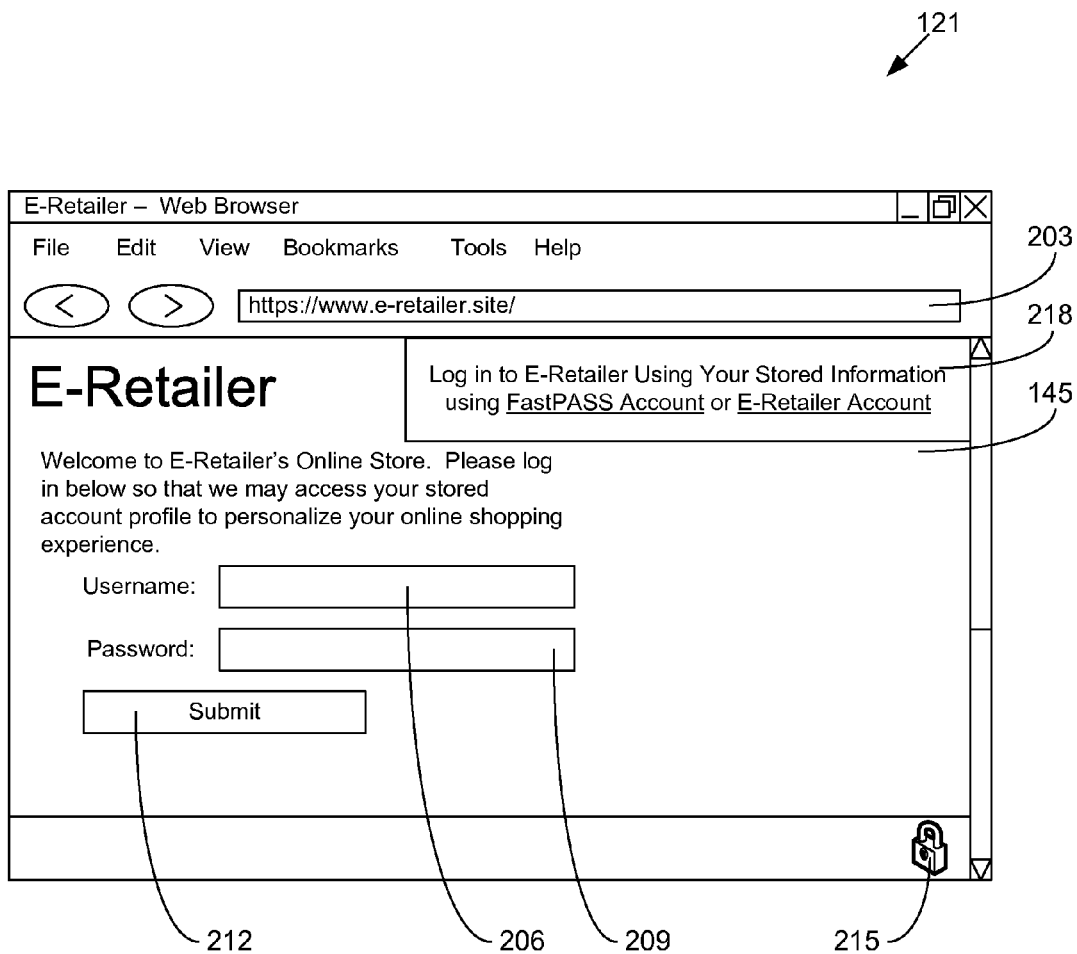
FIGS. 2A-2C are drawings of examples of user interfaces rendered by a client in the networked environment of FIG. 1 according to various embodiments of the present disclosure.

Turning now to FIG. 2A, shown is an example of a network page 145 (FIG. 1) rendered by a browser 121 (FIG. 1) executed in a client 103 (FIG. 1) in the networked environment 100 (FIG. 1) according to various embodiments of the present disclosure. In this example, the user may have entered, or may have been automatically redirected to, the URL "https://www.e-retailer.site/," which is displayed in the address bar 203 of the browser 121. The network page 145 provided by the network site 140 (FIG. 1) in response to the URL includes an authentication form having a username field 206, a password field 209, and a submit button 212.

The browser 121 includes a security indication 215 that indicates that the network site 140 has presented a trusted certificate and the communication between the client 103 and the computing device 106 (FIG. 1) is being encrypted. In FIG. 2A, the authentication management client 124 (FIG. 1) has verified the identity of the network site 140 and is presenting an authentication system selection 218. The authentication system selection 218 indicates that the user has installed the authentication management client 124 and that account information associated with the network site 140 is available. In particular, the authentication system selection 218 allows for selection of account data from among multiple authentication services 137 (FIG. 1). It may be assumed in FIG. 2A that the user has previously authenticated with the authentication management client 124 or that an opportunity to authenticate will be presented if a supported authentication service 137 is selected. If account data did not exist, the authentication system selection 218 may allow for account creation with a selected authentication service 137.

Once a user selects the authentication service 137, the authentication management client 124 may fill in the username field 206 and the password field 209. The authentication management client 124 may also automatically submit the logon request by programmatically pressing the submit button 212. In some embodiments, the username field 206 and password field 209 may be prefilled automatically with the security credential upon verification of the identity of the network site 140. The security credentials may be shown as place holding characters or as plain text.

Alternatively, if, for example, an authentication endpoint 139 (FIG. 1) is defined, the authentication management client 124 or the authentication management service 163 (FIG. 1) may authenticate with the authentication endpoint 139 in the background. The authentication management client 124 may give an indication of success or failure and may provide another user interface element in order to log out of the network site 140.

Figure 2B:
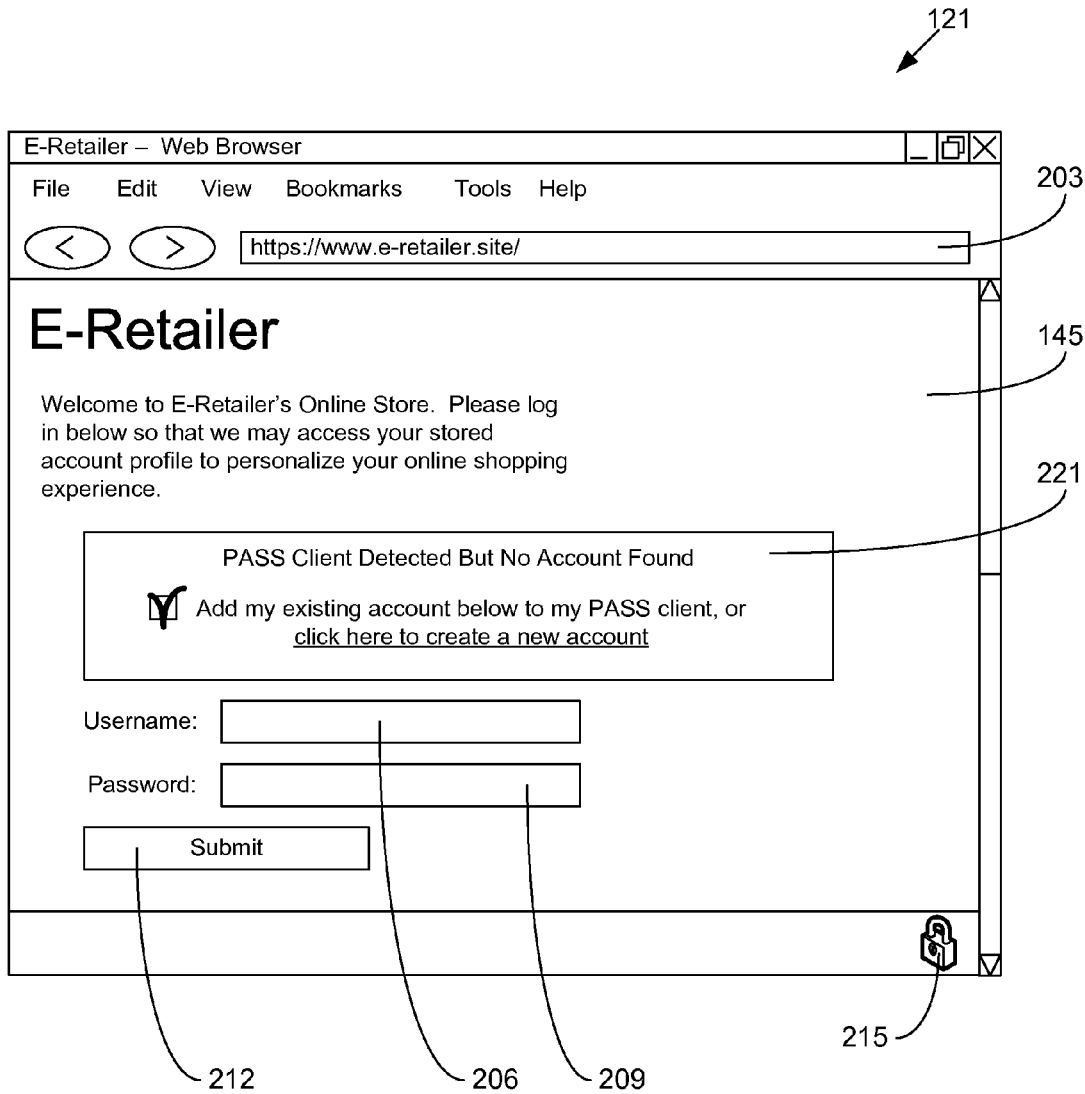

Moving on to FIG. 2B, shown is another example of a network page 145 (FIG. 1) rendered by a browser 121 (FIG. 1) executed in a client 103 (FIG. 1) in the networked environment 100 (FIG. 1) according to various embodiments of the present disclosure. In the example of FIG. 2B, an authentication management client 124 (FIG. 1) is configured in the client 103, but no account is found for the current network site 140 (FIG. 1). Thus, the user is presented with the username field 206 and the password field 209 and a notification 221 that no account is found. A checkbox or other user interface component may be provided in association with the notification 221 for the user to consent to add the provided legacy account information to the authentication management client 124. Further, a link, button, or other user interface component may be provided for the user to consent to account creation.

Figure 2C:
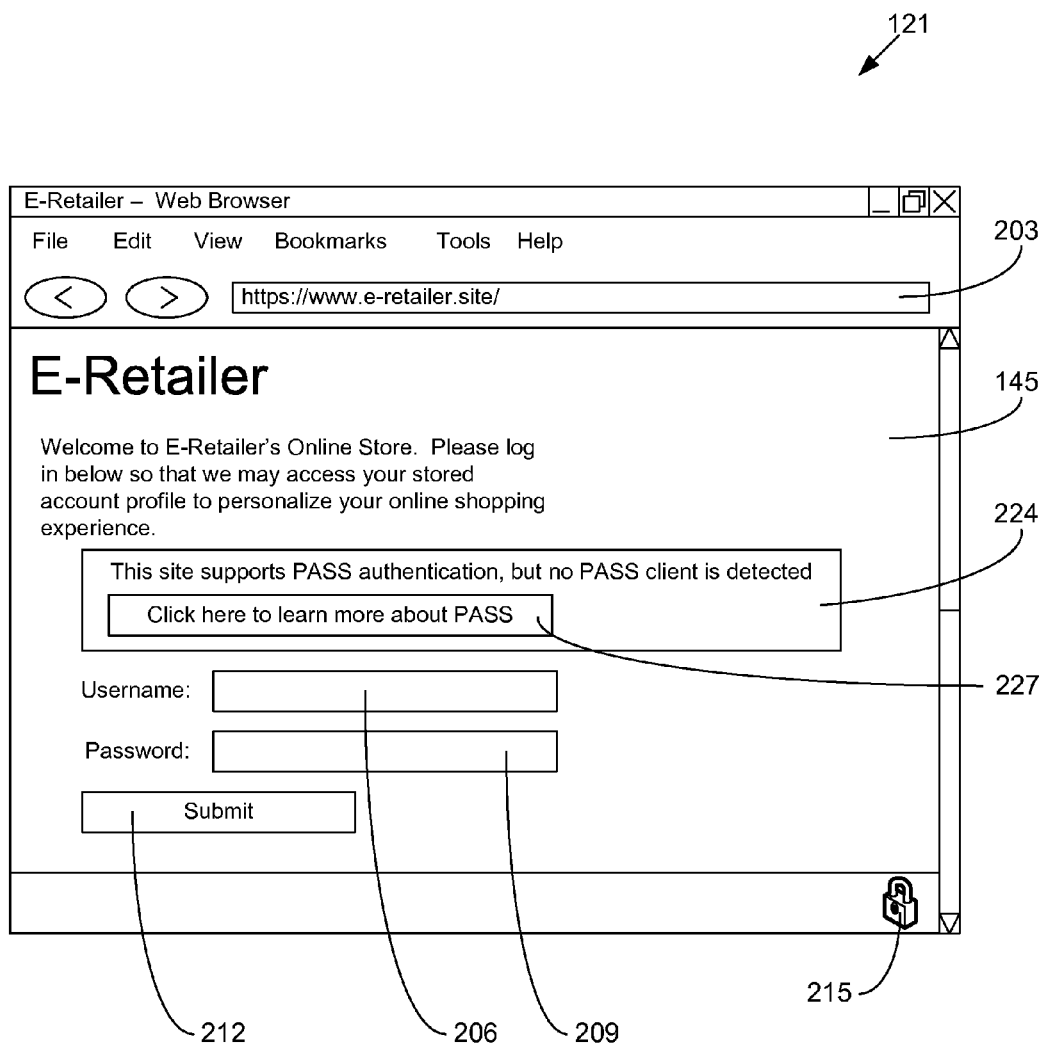

With reference to FIG. 2C, shown is yet another example of a network page 145 (FIG. 1) rendered by a browser 121 (FIG. 1) executed in a client 103 (FIG. 1) in the networked environment 100 (FIG. 1) according to various embodiments of the present disclosure. In the example of FIG. 2C, the network site 140 (FIG. 1) supports authentication by way of an authentication management client 124 (FIG. 1), but no authentication management client 124 is detected. In this case, a notification 224 may be presented to that effect. The notification 224 may be presented in association with a user interface component 227 such as a button, link, etc. to allow the user to view more information about the authentication management client 124, to create an account with an authentication management service 163 (FIG. 1), to download and/or install an authentication management client 124, and/or perform other actions. Alternatively, the user may log on to the network site 140 with a legacy username and password using the username field 206 and the password field 209.

Figure 3:
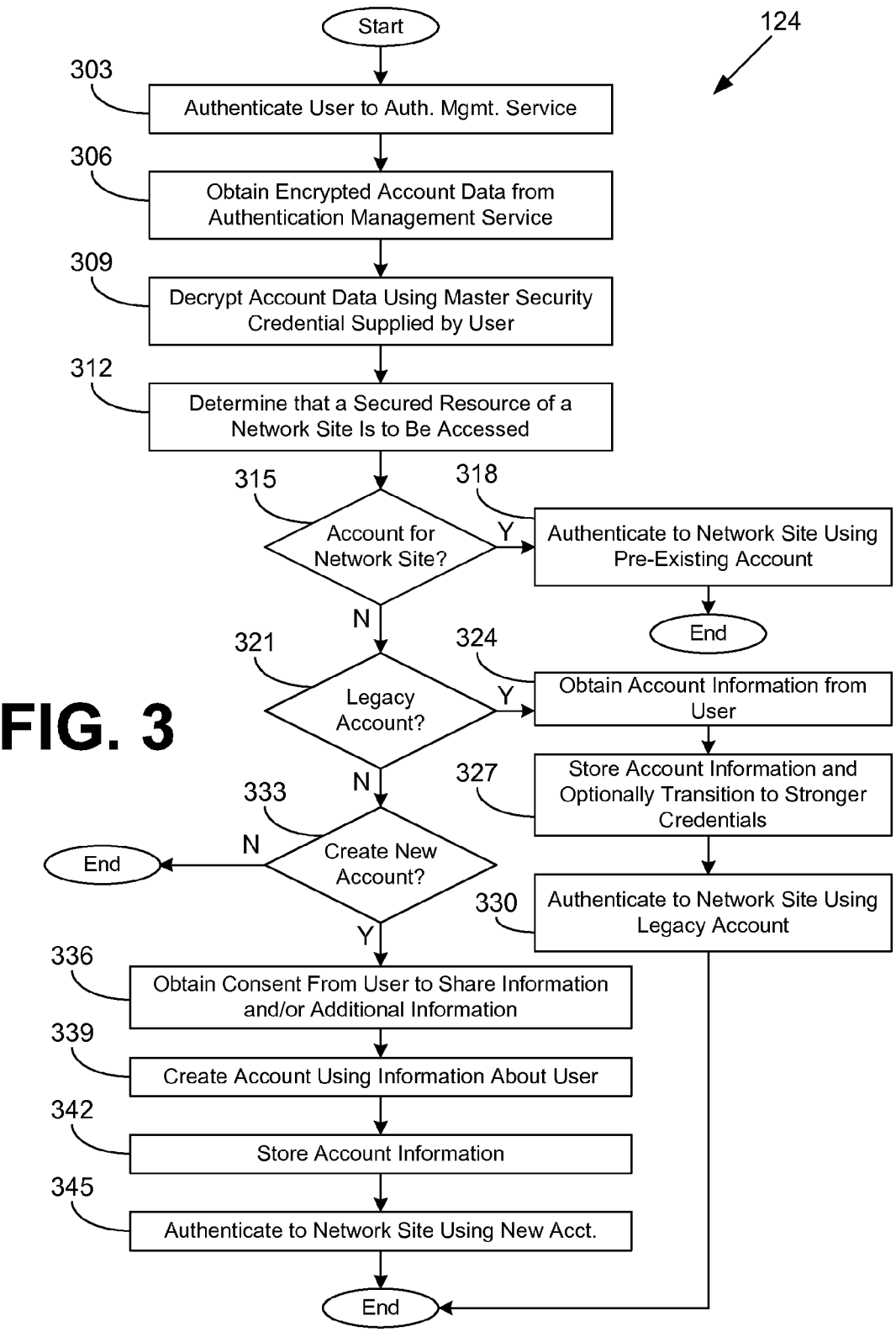
FIGS. 3-6B are flowcharts illustrating examples of functionality implemented as portions of an authentication management client executed in a client in the networked environment of FIG. 1 according to various embodiments of the present disclosure.

Referring next to FIG. 3, shown is a flowchart that provides one example of the operation of a portion of the authentication management client 124 according to various embodiments. It is understood that the flowchart of FIG. 3 provides merely an example of the many different types of functional arrangements that may be employed to implement the operation of the portion of the authentication management client 124 as described herein. As an alternative, the flowchart of FIG. 3 may be viewed as depicting an example of steps of a method implemented in the client 103 (FIG. 1) according to one or more embodiments.

Beginning with box 303, the authentication management client 124 authenticates a user to an authentication management service 163 (FIG. 1). For example, a user may log in to an operating system session which is tied to a session of the authentication management client 124. Alternatively, the user may log in to the authentication management client 124 directly. In box 306, the authentication management client 124 obtains encrypted account data from the authentication management service 163. In some cases, this encrypted account data may already be stored in the client 103 as client account data 130 (FIG. 1) or in a portable data store 118 (FIG. 1) as portable account data 178 (FIG. 1). In box 309, the authentication management client 124 decrypts the encrypted account data based at least in part on a master security credential supplied by the user. The decrypted account data may be stored, at least ephemerally, as the client account data 130 for use during a user session of the authentication management client 124.

In box 312, the authentication management client 124 determines that a secured resource of a network site 140 (FIG. 1) is to be accessed. For example, the user may employ the browser 121 (FIG. 1) to navigate to a secured network page 145 (FIG. 1) or other secured network resource. In box 315, the authentication management client 124 determines whether the client account data 130 includes an account for the network site 140 (or an identity provider used by the network site 140). To this end, the authentication management client 124 may determine one or more authentication services 137 (FIG. 1) associated with the network site 140 having an authentication endpoint 139 (FIG. 1) and an account creation endpoint 138 (FIG. 1). The authentication services 137 may correspond to third-party authentication providers in some cases. The authentication management client 124 may send a query to the network site 140 to determine the supported authentication services 137 and/or may determine the supported authentication services 137 based at least in part on the content of a network resource already obtained by the browser 121.

The authentication management client 124 may determine the existence of an account in the client account data 130 according to the domain name of the network site 140 or through other identifying data available from the network site 140. In one embodiment, the authentication management client 124 may query the authentication management service 163 to obtain information to map the domain name of the network site 140 to a stored account. In another embodiment, the authentication management client 124 may perform a matching on at least a portion of the domain name, such as the second-level domain name, e.g., "e-retailer" within "e-retailer.com" and "e-retailer.co.uk." Thus, the different first-level domain names may be ignored when determining which account may be used.

Where a matching is performed across different domain names, an explicit user confirmation may be solicited before an identified existing account is actually utilized. Where multiple accounts are configured for the same base domain name, the account having the longest match may be employed. As a non-limiting example, an account for "us.e-retailer.com" may be preferred to log into "www.e-retailer.com" instead of an account for "e-retailer.com."

If an existing account is identified, the authentication management client 124 authenticates to the authentication service 137 of the network site 140 using the security credentials of the pre-existing account in box 318. Subsequently, the secured resources of the network site 140 may be accessed. In most cases, this authentication may happen automatically without user intervention. However, in some cases (e.g., with high-value transactions), the authentication service 137 may set a flag in the authentication protocol to require explicit consent, thereby forcing the user to consent to the log in using the authentication management client 124. Also, where multiple accounts are identified, the authentication management client 124 may be configured to render a user interface to obtain a user selection of one of the accounts. Thereafter, the portion of the authentication management client 124 ends.

If an existing account is not identified, the authentication management client 124 moves from box 315 to box 321 and determines whether the user has a legacy account, i.e., an existing account not available in the client account data 130. To this end, the authentication management client 124 may render a user interface that is configured to prompt the user to enter legacy account information and security credentials, if the user has a legacy account. If the user has a legacy account, in box 324, the authentication management client 124 obtains the legacy account information from the user.

In box 327, the authentication management client 124 stores the legacy account information in the client account data 130. In some cases, the authentication management client 124 may transition the provided security credentials to stronger credentials as defined in a security credential specification. The user may be prompted to consent to such a credential change. In box 330, the authentication management client 124 authenticates with the network site 140 using the respective authentication service 137 and the legacy account information. Thereafter, the portion of the authentication management client 124 ends.

If the user does not provide legacy account information, or if the user provides a confirmation that the user does not have an existing account capable of accessing the secured resource, the authentication management client 124 moves from box 321 to box 333. In box 333, the authentication management client 124 determines whether a new account is to be created for the network site 140. For example, the user may have specified a set of information (e.g., name, email address, age, etc.) that may be shared with account creation endpoints 138 in order to create an account. The user may have established rules to automatically consent to the sharing of some information but not other information. If an account is not to be created, e.g., the user does not give consent or stored preferences disallow sharing of the information, the portion of the authentication management client 124 ends. Otherwise, if a new account is to be created for the user, the authentication management client 124 transitions from box 333 to box 336.

In box 336, the authentication management client 124 obtains consent from the user to share the information needed to create an account capable of accessing the secured resource. Such a consent may correspond to an explicit confirmation in a user interface, a stored consent preference, and/or other forms of consent. The authentication management client 124 may determine which set of information (out of a superset of information) is needed by obtaining an indication of the particular set from the account creation endpoint 138. The authentication management client 124 may obtain additional information from the user in some cases. The additional information may include freeform data, multiple choice selections, yes or no answers, and/or other data.

In box 339, the authentication management client 124 automatically creates the account using the set of information about the user by communicating with the account creation endpoint 138. In some cases, the account may be with an operator of the network site 140. In other cases, the account may be with a third-party identity provider, which may enable the account to access multiple secured resources across multiple network sites 140 associated with multiple operators.

In box 342, if the account was created successfully, the authentication management client 124 stores the resulting account information, including, for example, automatically generated security credentials, in the client account data 130. In box 345, the authentication management client 124 authenticates with the authentication endpoint 139 of the network site 140 using the new account to facilitate access to the secured resource. Thereafter, the portion of the authentication management client 124 ends.

Figure 4:
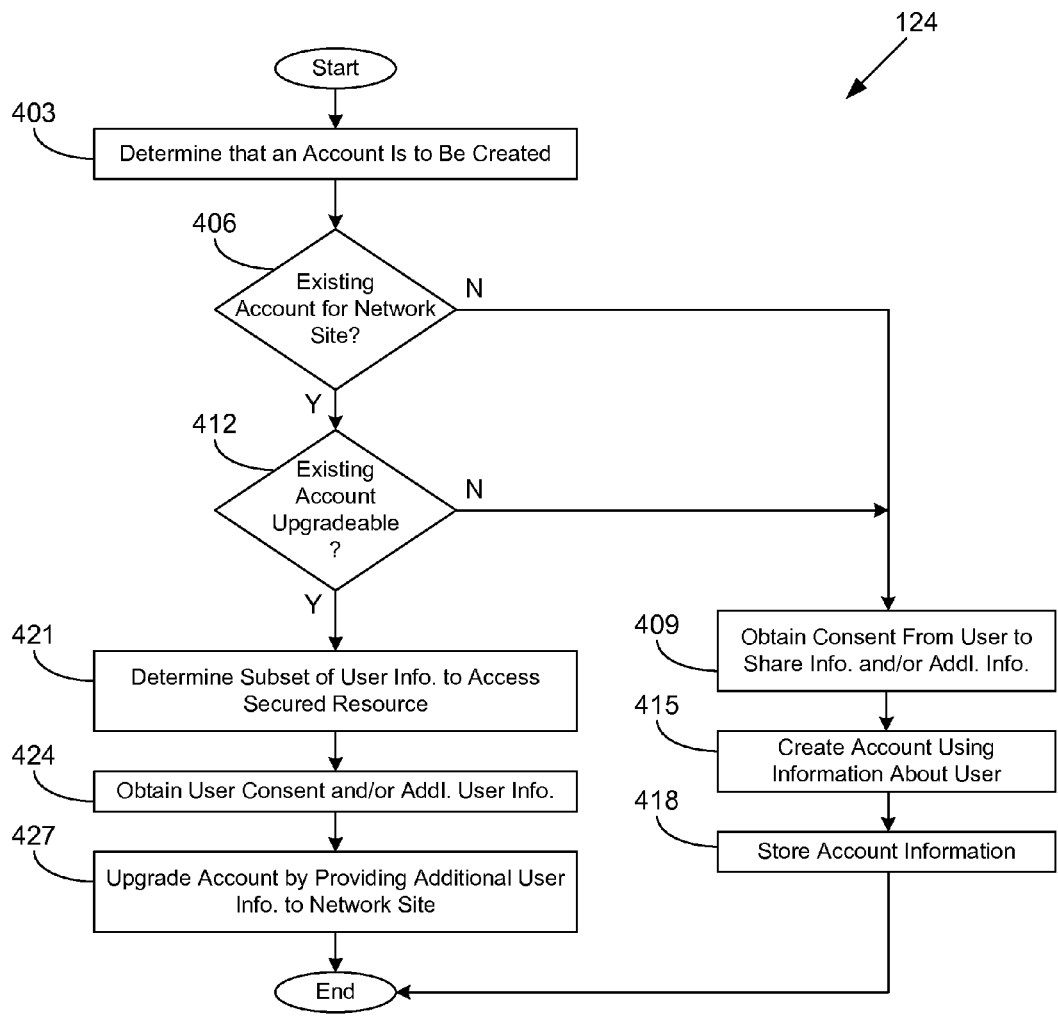

Turning now to FIG. 4, shown is a flowchart that provides one example of the operation of another portion of the authentication management client 124 according to various embodiments. Specifically, FIG. 4 relates to an account creation workflow that may include upgrading an existing account. Upgrading may be performed to access secured resources of a network site that are otherwise not accessible by the existing account. For example, a user may create an account with an online merchant to browse without providing a shipping address, but a shipping address may be necessary to place an order. The user may be able to upgrade the account to place the order by providing the shipping address. It is understood that the flowchart of FIG. 4 provides merely an example of the many different types of functional arrangements that may be employed to implement the operation of the portion of the authentication management client 124 as described herein. As an alternative, the flowchart of FIG. 4 may be viewed as depicting an example of steps of a method implemented in the client 103 (FIG. 1) according to one or more embodiments.

Beginning with box 403, the authentication management client 124 determines that an account is to be created with an authentication service 137 (FIG. 1) in order to access one or more secured resources of a network site 140 (FIG. 1). If an existing account is present, access to the specific secured resources may be denied through the particular existing account. In box 406, the authentication management client 124 determines whether the client account data 130 (FIG. 1) includes an existing account for the network site 140. If the client account data 130 does not include an existing account for the network site 140, the authentication management client 124 moves to box 409.

If the client account data 130 does include an existing account, the authentication management client 124 moves from box 406 to box 412 and determines whether the existing account is upgradeable in order to access the requested secured resource. If the existing account is not upgradeable, the authentication management client 124 moves from box 412 to box 409. It is noted that in some embodiments all or nearly all accounts may be capable of being upgraded and enriched with additional information when necessary. That is to say, it may be rare situation where a user already has an account with a network site 140 but has to create another account.

In box 409, the authentication management client 124 obtains consent from the user to share the information needed to create an account capable of accessing the secured resource. Such a consent may correspond to an explicit confirmation in a user interface, a stored consent preference, and/or other forms of consent. The user may also provide additional information. In box 415, the authentication management client 124 automatically creates an entirely new account using the set of information about the user, and potentially the newly provided information, by communicating with the account creation endpoint 138 (FIG. 1). In box 418, if the account was created successfully, the authentication management client 124 stores the resulting account information, including, for example, automatically generated security credentials, in the client account data 130. Thereafter, the portion of the authentication management client 124 ends.

If, instead, the authentication management client 124 determines that an existing account is upgradeable to access the secured resource, the authentication management client 124 proceeds from box 412 to box 421. In box 421, the authentication management client 124 determines a subset of the set of user information that is needed to upgrade the existing account to access the secured resource. In box 424, the authentication management client 124 obtains consent from the user to share the subset of user information. The authentication management client 124 may also or instead obtain further information from the user that is not already available in the set of user information. In box 427, the authentication management client 124 upgrades the existing account by providing the additional user information, including the subset of the set of user information and/or the newly provided user information, to the account creation endpoint 138 of the network site 140. Thereafter, the portion of the authentication management client 124 ends.

Figure 5:
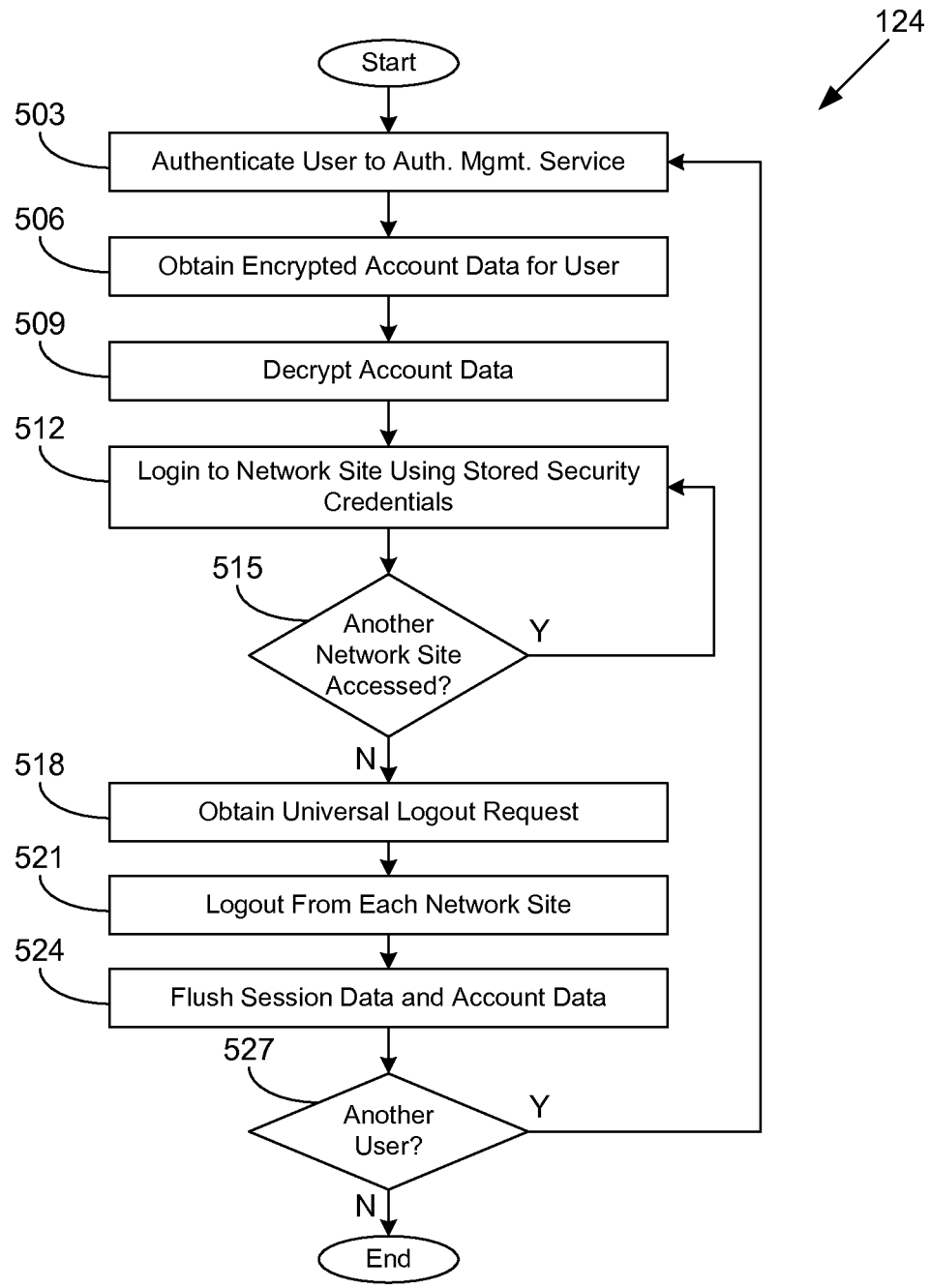

Moving on to FIG. 5, shown is a flowchart that provides one example of the operation of yet another portion of the authentication management client 124 according to various embodiments. In particular, FIG. 5 relates to multi-user use of the authentication management client 124 and logout from multiple network sites 140 (FIG. 1). It is understood that the flowchart of FIG. 5 provides merely an example of the many different types of functional arrangements that may be employed to implement the operation of the portion of the authentication management client 124 as described herein. As an alternative, the flowchart of FIG. 5 may be viewed as depicting an example of steps of a method implemented in the client 103 (FIG. 1) according to one or more embodiments.

Beginning with box 503, the authentication management client 124 authenticates a user with the authentication management service 163 (FIG. 1) in response to the user providing some security credential. In box 506, the authentication management client 124 obtains encrypted account data from the authentication management service 163. In box 509, the authentication management client 124 decrypts the account data based at least in part on a master security credential provided by the user. In box 512, the authentication management client 124 logs into a network site 140 by communicating with an authentication endpoint 139 (FIG. 1) of an authentication service 137 (FIG. 1).

The authentication management client 124 provides stored security credentials from the client account data 130 (FIG. 1). Where multiple authentication services 137 are available for a given network site 140, the user may explicitly select one of the authentication services 137, or one might be selected automatically according to a stored preference in the identity provider preference data 131 (FIG. 1). Where an account does not already exist, it may be created or upgraded automatically as previously described in connection with the flowcharts of FIGS. 3 and 4.

In box 515, the authentication management client 124 determines whether another network site 140 is accessed. Alternatively, another secured resource of the same network site 140 which requires a separate login may be accessed. If another network site 140 is accessed, the authentication management client 124 returns to box 512 and logs into the other network site 140 using stored security credentials. Thus, the authentication management client 124 may automatically authenticate with multiple authentication services 137 corresponding to multiple network sites 140. A respective session may be established for each network site 140, which may include session data such as session cookies stored by the browser 121 (FIG. 1), cached network resources, and so on. If another network site 140 is not accessed, the authentication management client 124 instead proceeds from box 515 to box 518.

In box 518, the authentication management client 124 obtains a universal logout request from the user. Such a logout request may be explicit, such as with the user selecting a single logout button on a user interface of the authentication management client 124, or implicit, such as with the user exiting the authentication management client 124. The user session of the authentication management client 124 may be ended upon a switch user request being made by the user, or when the user logs out of an operating system account. In some cases, a user session with the authentication management client 124 may be ended automatically after a predefined period of inactivity. In some embodiments, the user may provide a logout request for a specific network site 140 or a set of network sites 140.

In response to the logout request, in box 521, the authentication management client 124 logs out from each network site 140. To this end, the authentication management client 124 may automatically send a respective logout indication to each of the authentication services 137. In box 524, the authentication management client 124 may automatically flush any session data and client account data 130. Specifically, the decrypted account data may be removed from the client 103. Where the logout request is a specific logout request instead of a universal logout request, the logout may be performed only for the specified network sites 140. Thus, in the case of a specific logout, the user may continue to utilize sessions that were not indicated in the specific logout request.

In box 527, the authentication management client 124 determines whether another user is to use the authentication management client 124. For example, the authentication management client 124 may be configured to accommodate multiple users within a single operating system user session. If another user is to be authenticated, the authentication management client 124 returns to box 503. Otherwise, the portion of the authentication management client 124 ends.

Figure 6A:
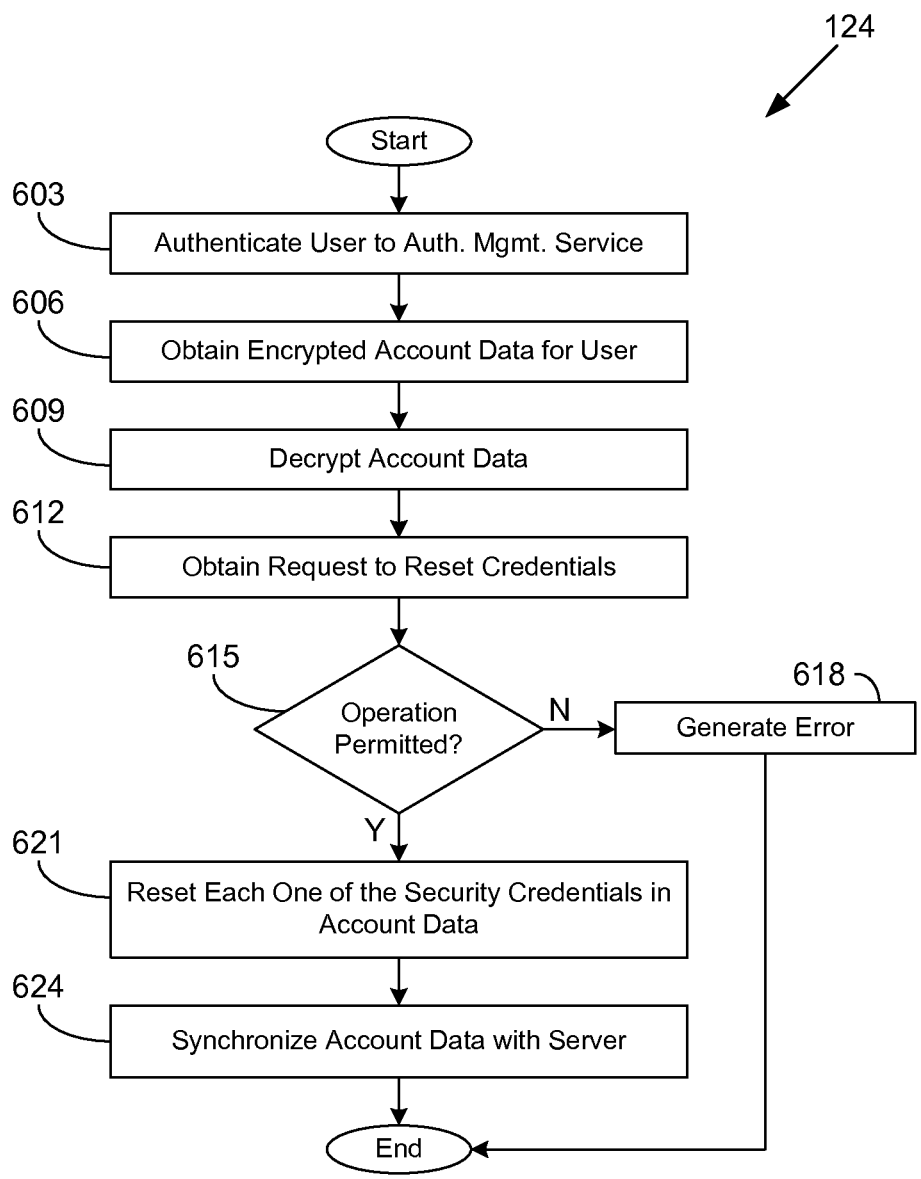

Continuing now to FIG. 6A, shown is a flowchart that provides one example of the operation of yet another portion of the authentication management client 124 according to various embodiments. In particular, FIG. 6A relates to resetting security credentials. It is understood that the flowchart of FIG. 6A provides merely an example of the many different types of functional arrangements that may be employed to implement the operation of the portion of the authentication management client 124 as described herein. As an alternative, the flowchart of FIG. 6A may be viewed as depicting an example of steps of a method implemented in the client 103 (FIG. 1) according to one or more embodiments.

Beginning with box 603, the authentication management client 124 authenticates a user to the authentication management service 163 (FIG. 1) in response to the user providing some security credential. In box 606, the authentication management client 124 obtains encrypted account data from the authentication management service 163. In box 609, the authentication management client 124 decrypts the account data based at least in part on a master security credential provided by the user. In box 612, the authentication management client 124 obtains a request to reset the security credentials in the client account data 130 (FIG. 1). Such a request may encompass a reset request, a change request, and/or a temporary change request.

In box 615, the authentication management client 124 determines whether the operation is permitted. For example, the authentication management service 163 may configure the authentication management client 124 such that only the first client 103 registered for a particular authentication management account with the authentication management service 163 is permitted to perform certain operations, such as resetting the credentials and/or other operations. Other clients 103 may be preauthorized by the user as well. In some cases, the user may provide a one-time password to effect the reset or change, and the authentication management service 163 may enforce the one-time password. Also, in some cases, the authentication management client 124 may present one or more static knowledge-based questions 172 (FIG. 1) to the user to verify the identity of the user. The determination as to whether the operation is permitted may be made by the authentication management service 163.

If the operation is not permitted, the authentication management client 124 moves to box 618 and generates an error. Thereafter, the portion of the authentication management client 124 ends. Otherwise, the authentication management client 124 proceeds to box 621 and resets or changes each one of the security credentials for the accounts of the user in the client account data 130.

In some cases, the authentication management client 124 may establish a single temporary password in place of the automatically generated credentials. The authentication management client 124 may configure an expiration for the temporary password, where the security credentials are regenerated and reset for each of the accounts of the user after the expiration. In box 624, the authentication management client 124 synchronizes the client account data 130 with the server account data 166 (FIG. 1). Thereafter, the portion of the authentication management client 124 ends.

Figure 6B:
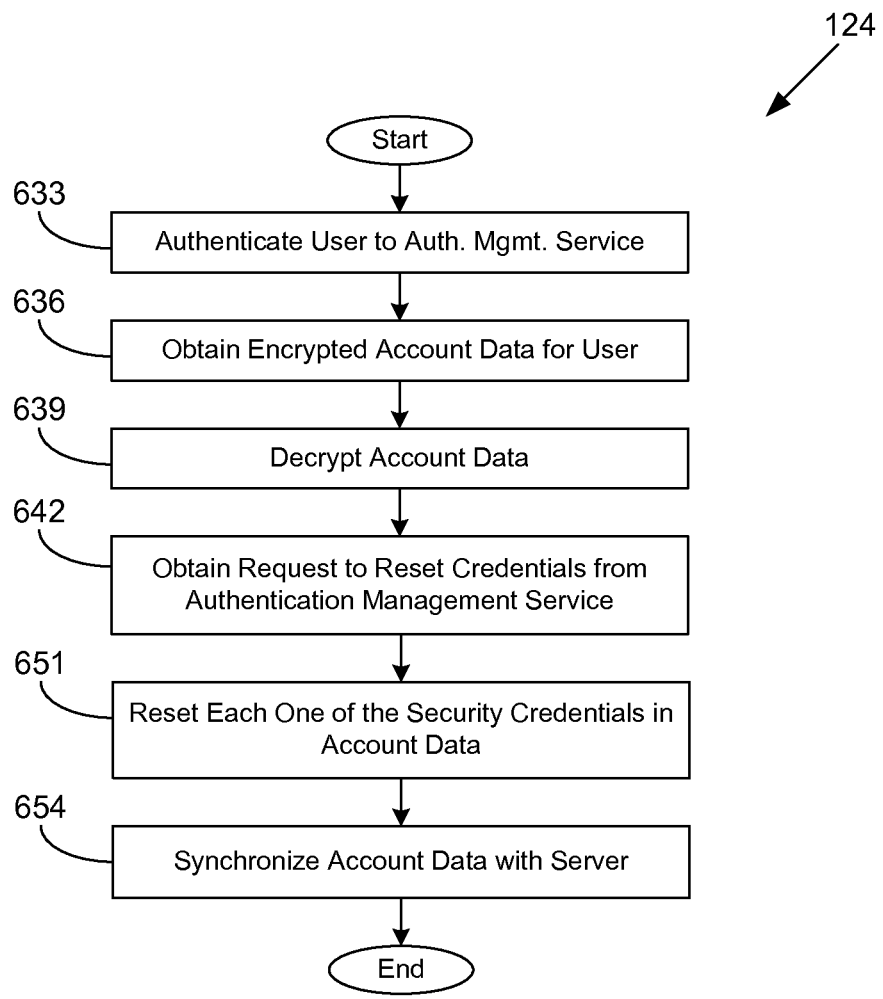

Transitioning to FIG. 6B, shown is a flowchart that provides one example of the operation of yet another portion of the authentication management client 124 according to various embodiments. In particular, FIG. 6B relates to resetting security credentials in response to a server-originated request. It is understood that the flowchart of FIG. 6B provides merely an example of the many different types of functional arrangements that may be employed to implement the operation of the portion of the authentication management client 124 as described herein. As an alternative, the flowchart of FIG. 6B may be viewed as depicting an example of steps of a method implemented in the client 103 (FIG. 1) according to one or more embodiments.

Beginning with box 633, the authentication management client 124 authenticates a user to the authentication management service 163 (FIG. 1) in response to the user providing some security credential. In box 636, the authentication management client 124 obtains encrypted account data from the authentication management service 163. In box 639, the authentication management client 124 decrypts the account data based at least in part on a master security credential provided by the user. In box 642, the authentication management client 124 obtains a request to reset the security credentials from the authentication management service 163. Such a request may be one-time or periodic in nature.

The authentication management client 124 proceeds to box 651 and resets or changes each one of the security credentials for the accounts of the user in the client account data 130. In some cases, the authentication management client 124 may establish a single temporary password in place of the automatically generated credentials. The authentication management client 124 may configure an expiration for the temporary password, where the security credentials are regenerated and reset for each of the accounts of the user after the expiration. In box 654, the authentication management client 124 synchronizes the client account data 130 with the server account data 166 (FIG. 1). Thereafter, the portion of the authentication management client 124 ends.

Figure 7:
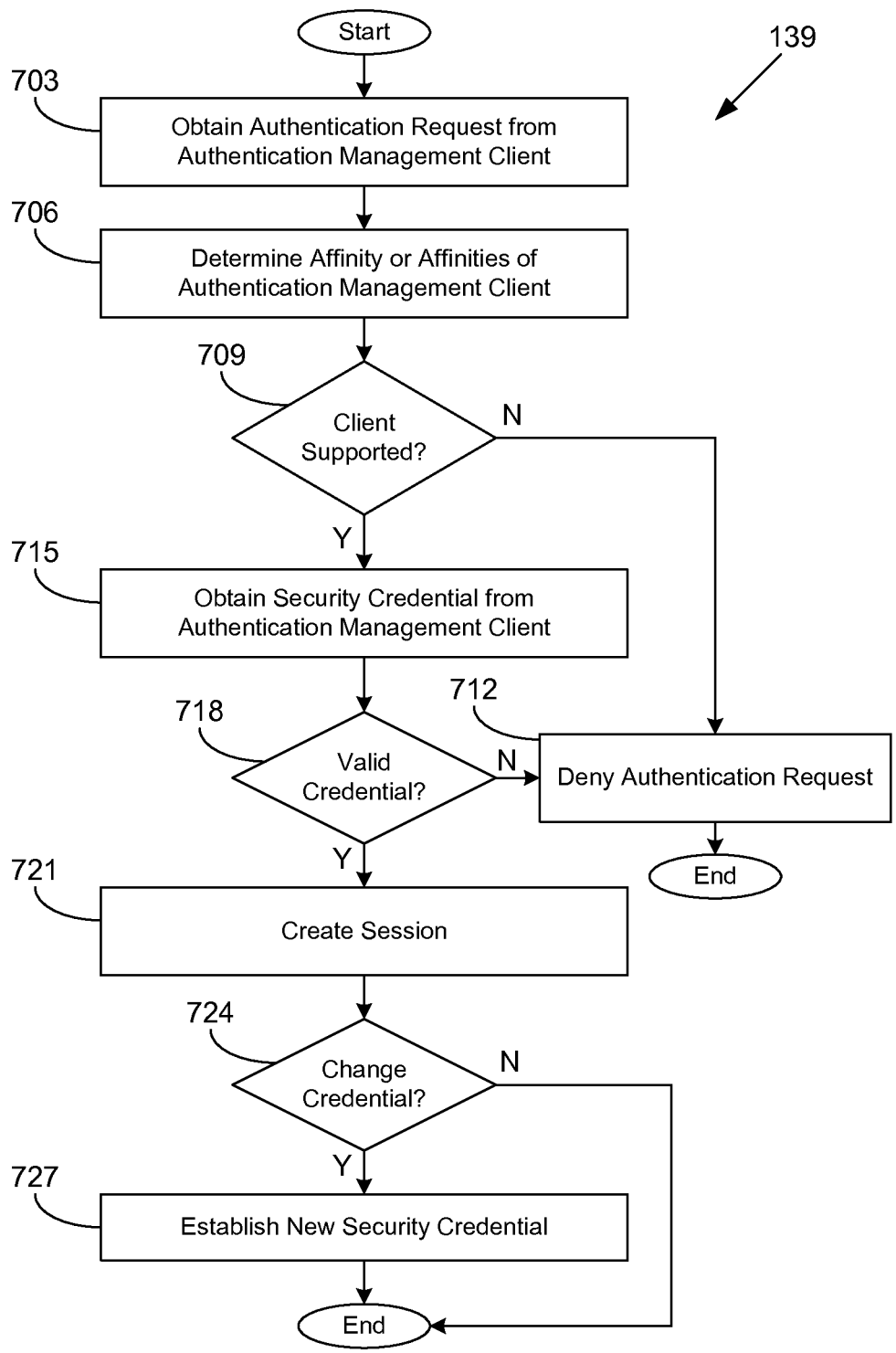
FIG. 7 is a flowchart illustrating one example of functionality implemented as portions of an authentication endpoint executed in a computing device in the networked environment of FIG. 1 according to various embodiments of the present disclosure.

Referring next to FIG. 7, shown is a flowchart that provides one example of the operation of a portion of the authentication endpoint 139 according to various embodiments. It is understood that the flowchart of FIG. 7 provides merely an example of the many different types of functional arrangements that may be employed to implement the operation of the portion of the authentication endpoint 139 as described herein. As an alternative, the flowchart of FIG. 7 may be viewed as depicting an example of steps of a method implemented in the computing device 106 (FIG. 1) according to one or more embodiments.

Beginning with box 703, the authentication endpoint 139 obtains an authentication request from an authentication management client 124 (FIG. 1). The authentication request may be obtained by way of an authentication protocol supported by multiple authentication management clients 124 having different affinities for authentication management services 163 (FIG. 1). For example, an authentication management client 124 may be distributed by a provider of an authentication management service 163, and the authentication management client 124 may have an affinity for the particular authentication management service 163. As another example, the authentication management client 124 may be distributed by a third party but may still have an affinity for a particular authentication management service 163 or a set of a plurality of authentication management services 163.

In box 706, the authentication endpoint 139 determines the affinity of authentication management client 124 from the request. For example, the authentication endpoint 139 may determine the affinity of the authentication management client 124 according to an identifier in a user agent string. It may be the case that the authentication endpoint 139 supports some authentication management clients 124 but not others. Similarly, the account creation endpoint 138 (FIG. 1) may support some authentication management clients 124 but not others.

In box 709, the authentication endpoint 139 determines whether the particular authentication management client 124 is supported. If the authentication management client 124 is not supported, the authentication endpoint 139 moves to box 712 and denies the authentication request. Thereafter, the portion of the authentication endpoint 139 ends. If the authentication management client 124 is supported, the authentication endpoint 139 moves from box 709 to box 715.

In box 715, the authentication endpoint 139 obtains a security credential from the authentication management client 124. In box 718, the authentication endpoint 139 determines whether the credential is valid. If the credential is not valid, the authentication endpoint 139 moves to box 712 and denies authentication request. Thereafter, the portion of the authentication endpoint 139 ends.

In box 721, the authentication endpoint 139 creates a session for the user in response to the successful authentication. To this end, the authentication endpoint 139 may set one or more session cookies with a session token and/or perform other actions. In addition, the authentication endpoint 139 may send branded experience data (such as, for example, logos, graphics, text, etc.) to the authentication management client 124. The authentication management client 124 may be configured to customize a user interface in the client 103 (FIG. 1) for an identity provider associated with the authentication endpoint 139 based at least in part on the branded experience data. The branded experience data may include, for example, a logo for a network site 140 or identity provider, a link to a privacy policy, a link for terms of use, and/or other information.

In box 724, the authentication endpoint 139 determines whether the security credential employed by the authentication management client 124 is to be changed. Such a change may be prompted by a manual change request from the user or by expiration of a predefined change interval in the authentication endpoint 139 or in the authentication management client 124. If the security credential is to be changed, the authentication endpoint 139 moves from box 724 to box 727 and establishes the new security credential. Such a credential may be generated by the authentication endpoint 139 and sent to the authentication management client 124, or it may be generated by the authentication management client 124 and then sent to the authentication endpoint 139. Thereafter, the portion of the authentication endpoint 139 ends. If the security credential is not to be changed, the portion of the authentication endpoint 139 also ends.

Figure 8:
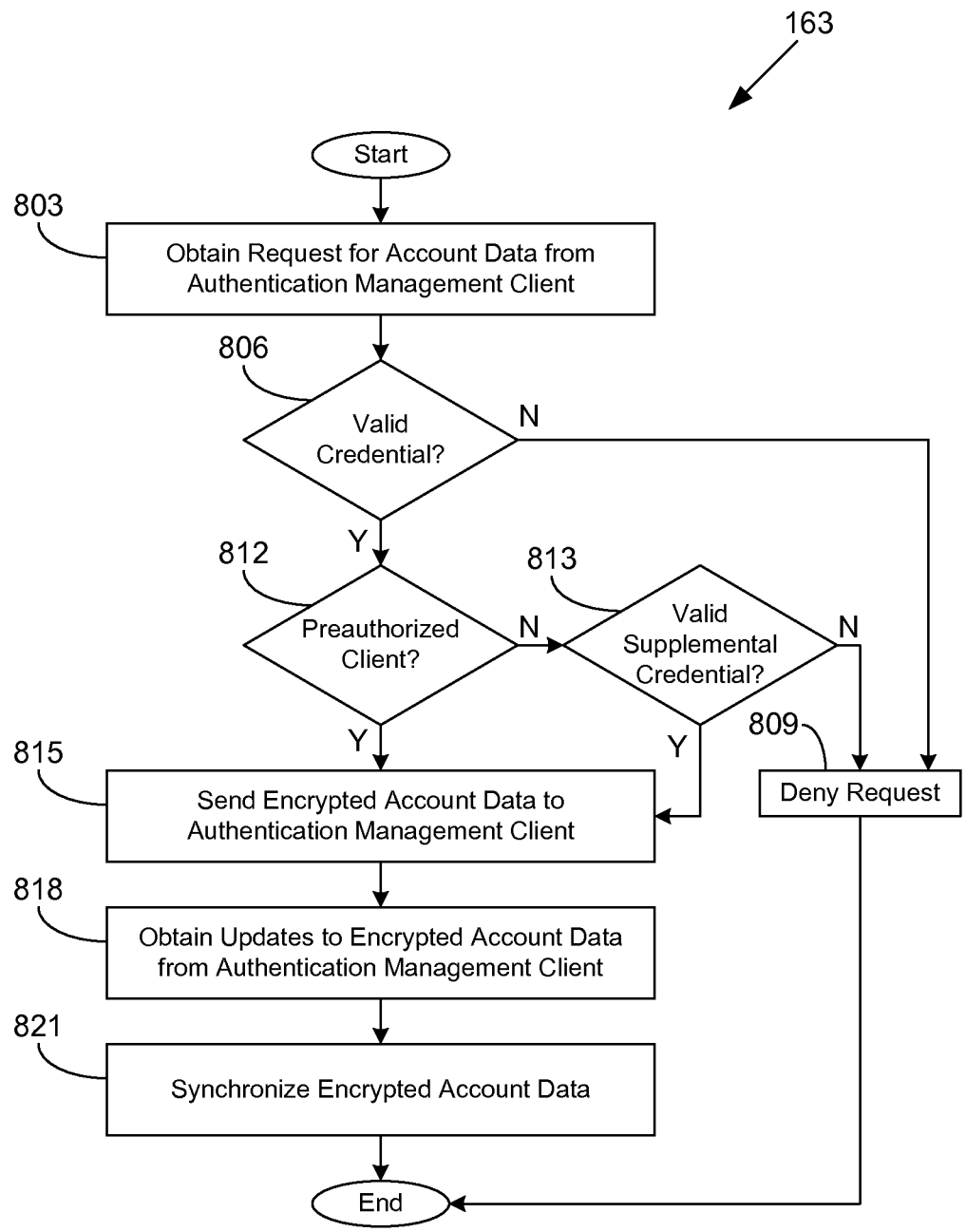
FIG. 8 is a flowchart illustrating one example of functionality implemented as portions of an authentication management service executed in a computing device in the networked environment of FIG. 1 according to various embodiments of the present disclosure.

Moving on to FIG. 8, shown is a flowchart that provides one example of the operation of a portion of the authentication management service 163 according to various embodiments. It is understood that the flowchart of FIG. 8 provides merely an example of the many different types of functional arrangements that may be employed to implement the operation of the portion of the authentication management service 163 as described herein. As an alternative, the flowchart of FIG. 8 may be viewed as depicting an example of steps of a method implemented in the computing device 112 (FIG. 1) according to one or more embodiments.

Beginning with box 803, the authentication management service 163 obtains a request for account data from an authentication management client 124 (FIG. 1) at a client 103 (FIG. 1). In box 806, authentication management service 163 determines whether the request includes a valid master credential 169 (FIG. 1). If the request does not include the valid master credential 169 for the user associated with the account data, the authentication management service 163 transitions to box 809 and denies the request for the account data. Thereafter, the portion of the authentication management service 163 ends.

If the request does specify a valid master credential 169, the authentication management service 163 continues from box 806 to box 812 and determines whether the client 103 corresponds to a preauthorized client 103. For example, the authentication management service 163 may evaluate a source network address of the request, a client-identifying token presented in the request, and/or other data. If the authentication management service 163 determines that the client 103 does not correspond to a preauthorized client 103, the authentication management service 163 moves to box 813 and prompts the client 103 for a valid supplemental credential 170 (FIG. 1), such as a one-time password, an answer to a knowledge-based question, etc. If a valid supplemental credential 170 is not provided, the authentication management service 163 moves to box 809 and denies the request for the account data. Thereafter, the portion of the authentication management service 163 ends.

If a valid supplemental credential 170 is provided, the authentication management service 163 continues from box 813 to box 815. If the client 103 is instead preauthorized, the authentication management service 163 moves from box 812 to box 815. In box 815, the authentication management service 163 sends some or all of the encrypted account data from the server account data 166 (FIG. 1) to the authentication management client 124. In box 818, the authentication management service 163 may obtain updates to the encrypted account data from the authentication management client 124. If the authentication management service 163 obtains such updates, the authentication management service 163 synchronizes the server account data 166 in box 821. Thereafter, the portion of the authentication management service 163 ends.

Figure 9:
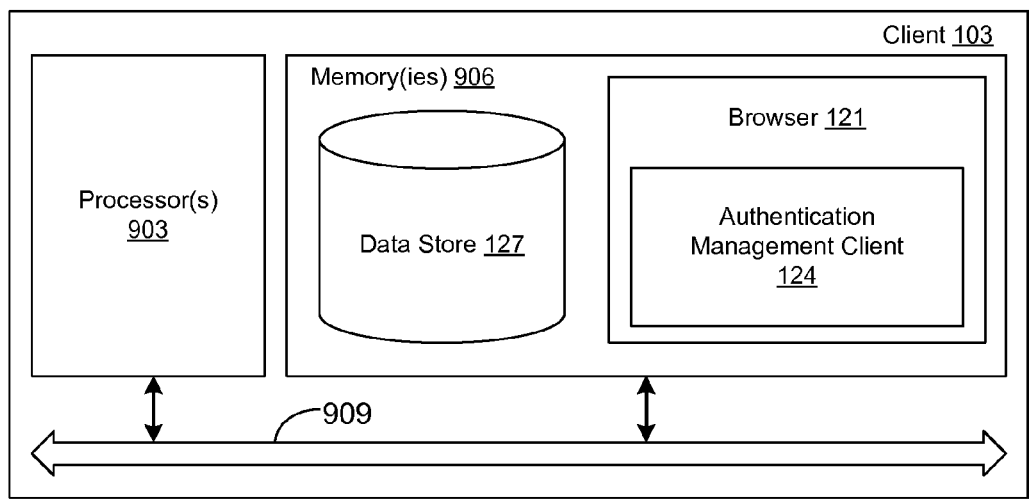
FIG. 9 is a schematic block diagram that provides one example illustration of a client employed in the networked environment of FIG. 1 according to various embodiments of the present disclosure.

With reference to FIG. 9, shown is a schematic block diagram of the client 103 according to an embodiment of the present disclosure. The client 103 includes at least one processor circuit, for example, having a processor 903 and a memory 906, both of which are coupled to a local interface 909. To this end, the client 103 may comprise, for example, at least one client computer or like device. The local interface 909 may comprise, for example, a data bus with an accompanying address/control bus or other bus structure as can be appreciated. The computing devices 106 and 112 may be illustrated similarly to the client 103, and the following discussion also pertains to computing devices 106 and 112.

Stored in the memory 906 are both data and several components that are executable by the processor 903. In particular, stored in the memory 906 and executable by the processor 903 are the browser 121, the authentication management client 124, and potentially other applications. Also stored in the memory 906 may be a data store 127 and other data. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the browser 121, the authentication management client 124, the network page server 136 (FIG. 1), the authentication service 137 (FIG. 1), the authentication management service 163 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-8 show the functionality and operation of an implementation of portions of the authentication management client 124, the authentication endpoint 139 (FIG. 1), and the authentication management service 163. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 3-8 show a specific order of execution, it is understood that the order of execution may differ from that which is depicted. For example, the order of execution of two or more blocks may be scrambled relative to the order shown. Also, two or more blocks shown in succession in FIGS. 3-8 may be executed concurrently or with partial concurrence. Further, in some embodiments, one or more of the blocks shown in FIGS. 3-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the browser 121, the authentication management client 124, the network page server 136, the authentication service 137, and the authentication management service 163, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   store account data including a plurality of security credentials associated with a plurality of network sites for a user, the account data being stored in an encrypted form;
   obtain a request for the account data from a client, the request specifying a security credential for accessing the account data;
   determine whether the client corresponds to a preauthorized client based at least in part on a network address of the client or a client-identifying token included in the request;
   send, responsive to the client corresponding to the preauthorized client and responsive to the security credential being valid, the account data to the client;
   obtain, responsive to the client not corresponding to the preauthorized client, a supplemental credential from the client;
   send, responsive to the supplemental credential being valid and responsive to the security credential being valid, the account data to the client;
   obtain a second request to use one of a plurality of account data recovery mechanisms from the client;
   determine, on a per-client basis, a subset of the plurality of account recovery mechanisms available to the client;

enable use of the subset of the account recovery mechanisms available to the client; and disable use of those of the plurality of account recovery mechanisms excluded from the subset of the account recovery mechanisms.

2. The non-transitory computer-readable medium of claim 1, wherein the supplemental credential comprises a knowledge-based question or a one-time password.

3. The non-transitory computer-readable medium of claim 1, wherein the supplemental credential comprises an answer to a knowledge-based question.

4. The non-transitory computer-readable medium of claim 1, wherein the program, when executed, further causes the computing device to encode for rendering an interface to selectively enable or disable one or more of the plurality of account recovery mechanisms with respect to a particular client.

5. A system, comprising:
at least one computing device configured to at least:
store account data including a plurality of security credentials associated with a plurality of network sites for a user, the account data being stored in an encrypted form;
obtain a request for the account data from a client, the request specifying a security credential for accessing the account data;
send the account data to the client in response to determining that the client corresponds to a preauthorized client and in response to determining that the security credential for accessing the account data is valid; and
obtain, in response to the client not corresponding to the preauthorized client, a supplemental credential from the client; and
send the account data to the client in response to determining that the security credential and the supplemental credential are valid;
obtain a second request to use one of a plurality of account data recovery mechanisms from the client;
determine, on a per-client basis, a subset of the plurality of account recovery mechanisms available to the client;
enable use of the subset of the account recovery mechanisms available to the client; and
disable use of those of the plurality of account recovery mechanisms excluded from the subset of the account recovery mechanisms.

6. The system of claim 5, wherein the security credential is stored by a removable computer-readable medium of the client.

7. The system of claim 5, further comprising determining whether the client corresponds to the preauthorized client based at least in part on a source network address of the request.

8. The system of claim 5, further comprising determining whether the client corresponds to the preauthorized client based at least in part on a client-identifying token presented in the request.

9. The system of claim 5, wherein the account data is sent to the client in the encrypted form.

10. The system of claim 5, wherein the system is operated by a third-party entity relative to the network sites.

11. The system of claim 5, wherein the supplemental credential comprises at least one of a one-time password or an answer to a knowledge-based question.

12. The system of claim 5, wherein the at least one computing device is further configured to at least encode for rendering an interface to selectively enable or disable one or more of the plurality of account recovery mechanisms with respect to a particular client.

13. A method, comprising:
storing, by at least one computing device, account data including a plurality of security credentials associated with a plurality of network sites for a user, the account data being stored in an encrypted form;
obtaining, by the at least one computing device, a request for the account data from a client, the request specifying a security credential for accessing the account data;
sending, by the at least one computing device, the account data to the client in response to determining that the client corresponds to a preauthorized client and in response to determining that the security credential for accessing the account data is valid; and
obtaining, by the at least one computing device, in response to the client not corresponding to the preauthorized client, obtains a supplemental credential from the client;
sending, by the at least one computing device, the account data to the client in response to determining that the supplemental credential is valid;
obtaining, by the at least one computing device, a second request to use one of a plurality of account data recovery mechanisms from the client;
determining, by the at least one computing device, on a per-client basis, a subset of the plurality of account recovery mechanisms available to the client;
enabling, by the at least one computing device, use of the subset of the account recovery mechanisms available to the client; and
disabling, by the at least one computing device, use of those of the plurality of account recovery mechanisms excluded from the subset of the account recovery mechanisms.

14. The method of claim 13, wherein the security credential is stored by a removable computer-readable medium of the client.

15. The method of claim 13, wherein the method further comprises determining, by the at least one computing device, whether the client corresponds to the preauthorized client based at least in part on a source network address of the request.

16. The method of claim 13, wherein the method further comprises determining, by the at least one computing device, whether the client corresponds to the preauthorized client based at least in part on a client-identifying token presented in the request.

17. The method of claim 13, wherein the account data is sent to the client in the encrypted form.

18. The method of claim 13, wherein the supplemental credential comprises a one-time password.

19. The method of claim 13, wherein the supplemental credential comprises an answer to a knowledge-based question.

20. The method of claim 13, further comprising encoding for rendering an interface to selectively enable or disable one or more of the plurality of account recovery mechanisms with respect to a particular client.

* * * * *